United States Patent
Kim et al.

(10) Patent No.: US 10,088,716 B2
(45) Date of Patent: Oct. 2, 2018

(54) LIQUID CRYSTAL DISPLAY DEVICE

(71) Applicant: SAMSUNG DISPLAY CO., LTD., Yongin-si, Gyeonggi-do (KR)

(72) Inventors: In Woo Kim, Asan-si (KR); Joong Tae Kim, Icheon-si (KR); Da Young Lee, Seoul (KR); Ki Hun Jeong, Asan-si (KR); Yong Tae Cho, Yongin-si (KR); Min Ha Hwang, Seoul (KR)

( * ) Notice: Subject to any disclaimer, the term of this patent is extended or adjusted under 35 U.S.C. 154(b) by 46 days.

(21) Appl. No.: 15/217,922

(22) Filed: Jul. 22, 2016

(65) Prior Publication Data

US 2017/0153515 A1    Jun. 1, 2017

(30) Foreign Application Priority Data

Nov. 26, 2015    (KR) .................... 10-2015-0166041

(51) Int. Cl.
   *G02F 1/1343*    (2006.01)

(52) U.S. Cl.
   CPC .. *G02F 1/134327* (2013.01); *G02F 1/134336* (2013.01); *G02F 2201/121* (2013.01); *G02F 2201/123* (2013.01)

(58) Field of Classification Search
   CPC .............................................. G02F 1/134327
   See application file for complete search history.

(56) References Cited

U.S. PATENT DOCUMENTS

| | | | |
|---|---|---|---|
| 2006/0215101 A1* | 9/2006 | Yamazaki | G02F 1/134309 349/143 |
| 2009/0290114 A1* | 11/2009 | Na | G02F 1/133707 349/139 |
| 2010/0157232 A1* | 6/2010 | Kim | G02F 1/1393 349/144 |
| 2013/0100388 A1* | 4/2013 | Matsushima | G02F 1/134363 349/123 |
| 2013/0135572 A1* | 5/2013 | Park | G02F 1/134336 349/143 |
| 2014/0078454 A1 | 3/2014 | Kim | |
| 2014/0092353 A1* | 4/2014 | Matsushima | G02F 1/133512 349/110 |
| 2014/0218670 A1* | 8/2014 | Nagano | G02F 1/133512 349/110 |
| 2014/0293177 A1* | 10/2014 | Matsushima | G02F 1/134363 349/33 |
| 2015/0022758 A1 | 1/2015 | Hwang et al. | |

(Continued)

*Primary Examiner* — Sang V Nguyen
(74) *Attorney, Agent, or Firm* — Innovation Counsel LLP

(57) ABSTRACT

An LCD includes: pixel electrodes; a common electrode including a plurality of slits; and a liquid crystal layer interposed between the pixel electrodes and the common electrode. The plurality of slits include a first slit and a second slit that are disposed adjacent to each other in a first direction. The first slit includes a first central portion and a first extension portion extending from the first central portion toward the second slit, and the second slit includes a second central portion and a first extension portion extending from the second central portion toward the first slit. An end of the first extension portion of the first slit and an end of the first extension portion of the second slit are spaced apart from each other; and disposed, in a staggered manner, on opposite sides of an imaginary center line connecting the first central portion and the second central portion.

13 Claims, 19 Drawing Sheets

(56) References Cited

U.S. PATENT DOCUMENTS

2015/0355511 A1* 12/2015 Shin ................. G02F 1/134336
  349/144
2016/0062189 A1* 3/2016 Chang ............... G02F 1/133707
  349/139
2016/0291419 A1* 10/2016 Yeh .................. G02F 1/134309

* cited by examiner

LIQUID CRYSTAL DISPLAY DEVICE

This application claims priority to Korean Patent Application No. 10-2015-0166041 filed on Nov. 26, 2015, and all the benefits accruing therefrom under 35 U.S.C. § 119, the disclosure of which is herein incorporated by reference in its entirety.

BACKGROUND

1. Field

The present disclosure relates to a liquid crystal display (LCD) device.

2. Description of the Related Art

A liquid crystal display (LCD) that is one of the most widely-used flat panel displays includes two substrates on which field-generating electrodes such as pixel electrodes and a common electrode are formed and a liquid crystal layer that is interposed between the two substrates.

The LCD generates an electric field and determines an alignment direction of liquid crystal molecules in the liquid crystal layer by applying a voltage to the field-generating electrodes. The LCD displays an image by controlling the polarization of light incident thereupon.

One of the popular types of the LCD is a vertical alignment (VA)-mode LCD. The VA-mode LCD aligns liquid crystal molecules such that the longitudinal axes of the liquid crystal molecules are perpendicular to the panels in the absence of an electric field. The VA-mode LCD is spotlighted because of its high contrast ratio and wide reference viewing angle. To realize a wide viewing angle, the VA-mode LCD may form, in one pixel, a plurality of domains that differ from one another in the alignment direction of liquid crystal molecules.

To form a plurality of domains in one pixel, cutouts such as slits may be formed on a field-generating electrode. In this case, a plurality of domains may be formed by allowing liquid crystal molecules to be realigned due to a fringe field formed between edges of the cutouts and the field-generating electrode facing the edges. Accordingly, an improved domain division scheme is needed to realize an LCD device with an improve display quality.

SUMMARY

In response to an upper electrode being provided with a plurality of cross-shaped slits to form a plurality of domains, gaps between the slits are narrow, and as a result, "open" defects may occur due to an over etching of the slits. The "open" defects may result in regional increases in the resistance of the upper electrode and may be exacerbated in return by a resistance heat. Exemplary embodiments of the present disclosure provide a new electrode pattern capable of preventing open pattern-type defects without causing a decrease in transmittance. Exemplary embodiments of the present disclosure also provide a liquid crystal display (LCD) device with an improved display quality. However, exemplary embodiments of the present disclosure are not restricted to those set forth herein. The above and other exemplary embodiments of the present disclosure will become more apparent to one of ordinary skill in the art to which the present disclosure pertains by referencing the detailed description given below.

According to an exemplary embodiment of the present disclosure, a liquid crystal display device includes: a plurality of pixel electrodes arranged in a row direction and a column direction; a common electrode including a plurality of slits that are arranged in the row direction and the column direction; and a liquid crystal layer interposed between the plurality of pixel electrodes and the common electrode, wherein: the plurality of slits include a first slit and a second slit that is disposed adjacent to the first slit in a first direction; the first slit includes a first central portion and a first extension portion that extends from the first central portion toward the second slit; the second slit includes a second central portion and a first extension portion that extends from the second central portion toward the first slit; an end of the first extension portion of the first slit and an end of the first extension portion of the second slit are spaced apart from each other; and the end of the first extension portion of the first slit and the end of the first extension portion of the second slit are disposed, in a staggered manner, on opposite sides of an imaginary center line that connects the first central portion and the second central portion.

In an exemplary embodiment, the plurality of slits may further include a third slit that is disposed adjacent to the first slit in a second direction; the first slit further includes a second extension portion that extends from the first central portion toward the third slit; the third slit includes a third central portion and a first extension portion that extends from the third central portion toward the first slit; an end of the second extension portion of the first slit and an end of the first extension portion of the third slit are spaced apart from each other; and the end of the second extension portion of the first slit and the end of the first extension portion of the third slit may be disposed, in a staggered manner, on opposite sides of an imaginary center line that connects the first central portion and the third central portion.

In an exemplary embodiment, the plurality of slits may further include a fourth slit that is disposed adjacent to the first slit in the second direction; the first slit further includes a third extension portion that extends from the first central portion toward the fourth slit; the fourth slit includes a fourth central portion and a first extension portion that extends from the fourth central portion toward the first slit; an end of the third extension portion of the first slit and an end of the first extension portion of the fourth slit are spaced apart from each other; and the end of the third extension portion of the first slit and the end of the first extension portion of the fourth slit may be disposed, in a staggered manner, on opposite sides of an imaginary center line that connects the first central portion and the fourth central portion.

In an exemplary embodiment, the end of the second extension portion of the first slit and the end of the third extension portion of the first slit may be disposed, in a staggered manner, on opposite sides of the imaginary center line that connects the first central portion and the third central portion.

In an exemplary embodiment, the end of the second extension portion of the first slit and the end of the third extension portion of the first slit may be disposed on the same side of the imaginary center line that connects the first central portion and the third central portion.

In an exemplary embodiment, the plurality of slits may further include a fifth slit that is disposed adjacent to the first slit in the first direction; the first slit further includes a fourth extension portion that extends from the first central portion toward the fifth slit; the fifth slit includes a fifth central portion and a first extension portion that extends from the fifth central portion toward the first slit; an end of the fourth extension portion of the first slit and an end of the first extension portion of the fifth slit are spaced apart from each other; and the end of the fourth extension portion of the first slit and the end of the first extension portion of the fifth slit may be disposed, in a staggered manner, on opposite sides of an imaginary center line that connects the first central portion and the fifth central portion.

In an exemplary embodiment, the end of the first extension portion of the first slit and the end of the fourth extension portion of the first slit may be disposed, in a staggered manner, on opposite sides of the imaginary center line that connects the first central portion and the second central portion.

In an exemplary embodiment, the end of the first extension portion of the first slit and the end of the fourth extension portion of the first slit may be disposed on the same side of the imaginary center line that connects the first central portion and the second central portion.

In an exemplary embodiment, a shortest distance between the end of the first extension portion of the first slit and the end of the first extension portion of the second slit may be 5 μm or larger.

In an exemplary embodiment, a point at which a line defining the shortest distance and the first extension portion of the first slit meet is defined as a first point, a point at which the line defining the shortest distance and the first extension portion of the second slit meet is defined as a second point, and a distance, in the first direction, between the first point and the second point may be shorter than the shortest distance.

In an exemplary embodiment, each of the plurality of pixel electrodes may include a plurality of unit pixel electrodes; the plurality of unit pixel electrodes include a first unit pixel electrode that is disposed in an area of overlap with the first slit; and the first unit pixel electrode includes a first body portion and a first branch portion that extends from the first body portion.

In an exemplary embodiment, the plurality of unit pixel electrodes may further include a second unit pixel electrode that is disposed in an area of overlap with the second slit; the second unit pixel electrode includes a second body portion and a second branch portion that extends from the second body portion; the plurality of pixel electrodes may further includes a connecting portion that connects the first body portion and the second body portion; and the connecting portion may be disposed in an area of overlap with the imaginary center line that connects the first central portion and the second central portion.

In an exemplary embodiment, a planar area of the first body portion of the first unit pixel electrode may be larger than a planar area of the first central portion of the first slit.

According to an exemplary embodiment of the present disclosure, a liquid crystal display device includes: a plurality of pixel electrodes arranged in a row direction and a column direction; a common electrode including a plurality of slits that are arranged in the row direction and the column direction; and a liquid crystal layer interposed between the plurality of pixel electrodes and the common electrode, wherein: the plurality of slits include a first slit and a second slit that is disposed adjacent to the first slit in a first direction; the first slit includes a first central portion and a first extension portion that extends from the first central portion toward the second slit; the second slit includes a second central portion and a first extension portion that extends from the second central portion toward the first slit; an end of the first extension portion of the first slit and an end of the first extension portion of the second slit are spaced apart from each other; the end of the first extension portion of the first slit is disposed on one side of an imaginary center line that connects the first central portion and the second central portion; and the end of the first extension portion of the second slit overlaps the imaginary center line that connects the first central portion and the second central portion.

In an exemplary embodiment, the plurality of slits may further include a third slit that is disposed adjacent to the first slit in a second direction; the first slit further includes a second extension portion that extends from the first central portion toward the third slit; the third slit includes a third central portion and a first extension portion that extends from the third central portion toward the first slit; an end of the second extension portion of the first slit and an end of the first extension portion of the third slit are spaced apart from each other; the end of the second extension portion of the first slit may be disposed on one side of an imaginary center line that connects the first central portion and the third central portion; and the end of the first extension portion of the third slit may overlap the imaginary center line that connects the first central portion and the third central portion.

In an exemplary embodiment, the plurality of slits may further include a fourth slit that is disposed adjacent to the first slit in the second direction; the first slit further includes a third extension portion that extends from the first central portion toward the fourth slit; the fourth slit includes a fourth central portion and a first extension portion that extends from the fourth central portion toward the first slit; an end of the third extension portion of the first slit and an end of the first extension portion of the fourth slit are spaced apart from each other; the end of the third extension portion of the first slit may overlap an imaginary center line that connects the first central portion and the fourth central portion; and the end of the first extension portion of the fourth slit may be disposed on one side of the imaginary center line that connects the first central portion and the fourth central portion.

In an exemplary embodiment, the plurality of slits may further include a fourth slit that is disposed adjacent to the first slit in the second direction; the first slit further includes a third extension portion that extends from the first central portion toward the fourth slit; the fourth slit includes a fourth central portion and a first extension portion that extends from the fourth central portion toward the first slit; an end of the third extension portion of the first slit and an end of the first extension portion of the fourth slit are spaced apart from each other; the end of the third extension portion of the first slit may be disposed on one side of an imaginary center line that connects the first central portion and the fourth central portion; and the end of the first extension portion of the fourth slit may overlap the imaginary center line that connects the first central portion and the fourth central portion.

In an exemplary embodiment, the plurality of slits may further include a fifth slit that is disposed adjacent to the first slit in the first direction; the first slit further includes a fourth extension portion that extends from the first central portion toward the fifth slit; the fifth slit includes a fifth central portion and a first extension portion that extends from the fifth central portion toward the first slit; an end of the fourth extension portion of the first slit and an end of the first extension portion of the fifth slit are spaced apart from each other; the end of the fourth extension portion of the first slit may overlap an imaginary center line that connects the first central portion and the fifth central portion; and the end of the first extension portion of the fifth slit may be disposed on one side of the imaginary center line that connects the first central portion and the fifth central portion.

In an exemplary embodiment, the plurality of slits may further include a fifth slit that is disposed adjacent to the first slit in the first direction; the first slit further includes a fourth extension portion that extends from the first central portion toward the fifth slit; the fifth slit includes a fifth central portion and a first extension portion that extends from the fifth central portion toward the first slit; an end of the fourth extension portion of the first slit and an end of the first extension portion of the fifth slit are spaced apart from each other; the end of the fourth extension portion of the first slit may be disposed on one side of an imaginary center line that connects the first central portion and the fifth central portion; and the end of the first extension portion of the fifth slit may overlap the imaginary center line that connects the first central portion and the fifth central portion.

In an exemplary embodiment, a shortest distance between the end of the first extension portion of the first slit and the end of the first extension portion of the second slit may be 5 µm or larger.

According to the exemplary embodiments, at least some of a plurality of slits formed on a common electrode may be pivoted relative to their respective central portions, thereby widening the gaps between the slits. Accordingly, "open" defects that may occur due to an over-etching may be prevented. By securing sufficient gaps between the slits, a common voltage may be uniformly applied to the common electrode. Since no regional increases in resistance occur, defects caused by resistance heat may be alleviated.

In addition, pattern defects may be improved without compromising transmittance, and thus, an LCD device with improved reliability may be provided. Other features and exemplary embodiments will be apparent from the following detailed description, the drawings, and the claims.

DETAILED DESCRIPTION OF THE EMBODIMENTS

Figure 1:
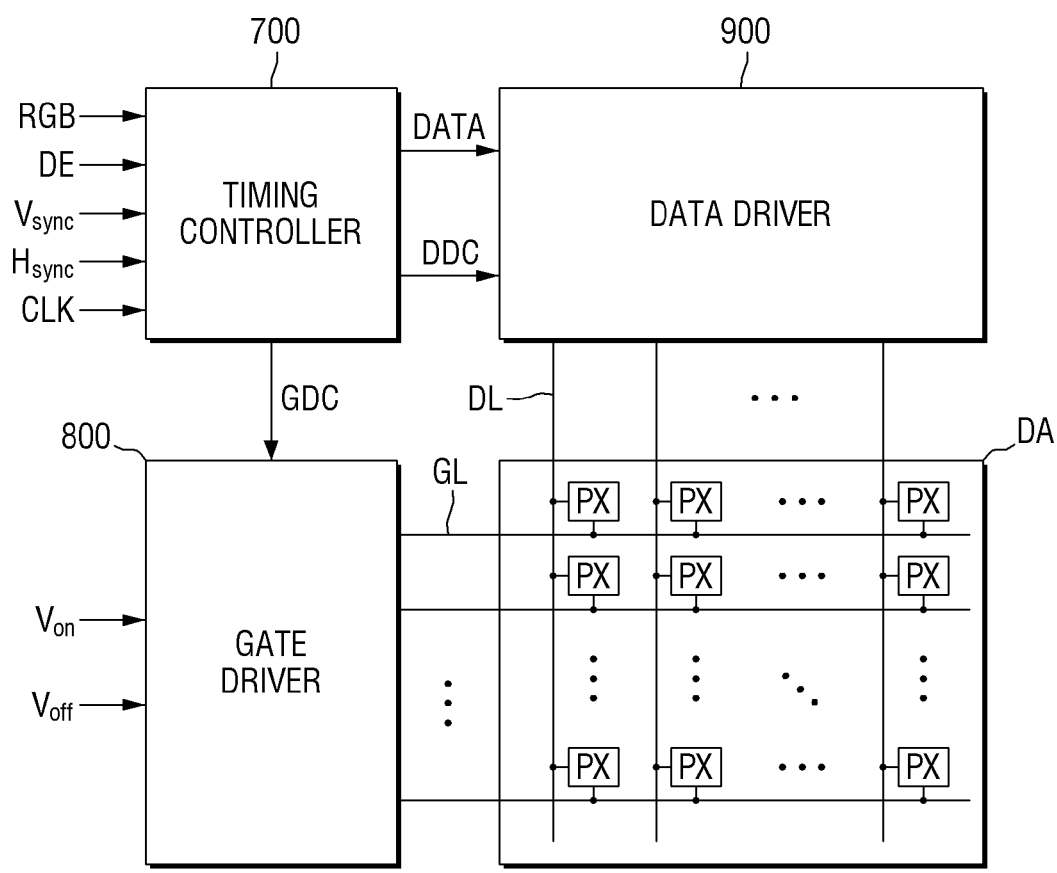
FIG. 1 is a schematic block diagram of a liquid crystal display (LCD) device, according to an exemplary embodiment of the present disclosure.

Features of the present disclosure and methods of accomplishing the same may be understood more readily by reference to the following detailed description and the accompanying drawings.

The present disclosure may, however, be embodied in many different forms and should not be construed as being limited to the embodiments set forth herein. Rather, these embodiments are provided so that the present disclosure will be thorough and complete and will fully convey the concept of the present disclosure to those skilled in the art.

In the drawings, the thickness of layers and regions may be exaggerated for clarity. It will be understood that when an element or layer is referred to as being "on," "connected to," or "coupled to" another element or layer, the element or layer can be directly on, connected or coupled to another element or layer or one or more intervening elements or layers. In contrast, when an element is referred to as being "directly on," "directly connected to," or "directly coupled to" another element or layer, there may be no intervening elements or layers present. As used herein, connected may refer to elements being physically, electrically and/or fluidly connected to each other.

Like numbers may refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "below," "lower," "under," "above," "upper," and the like, may be used herein for ease of description to describe a relationship of one element or feature to another element(s) or feature(s) as illustrated in the figures. It will be understood that the spatially relative terms are intended to encompass different orientations of the device in use or operation, in addition to the orientation depicted in the figures. For example, if a device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein may be interpreted accordingly.

The terminology used herein is for the purpose of describing particular embodiments only and is not intended to be limiting of the present disclosure. As used herein, the singular forms "a," "an," and "the" are intended to include a plural form as well, unless the context clearly indicates otherwise. It will be further understood that the terms "comprises," "comprising," "includes," and/or "including" used in this specification specify a presence of stated features, integers, operations, elements, and/or components, but do not preclude the presence or an addition of one or more other features, integers, steps, operations, elements, components, and/or groups thereof.

"About" or "approximately" used herein is inclusive of the stated value and means within an acceptable range of deviation for the particular value as determined by one of ordinary skill in the art, considering the measurement in question and an error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and the present disclosure, and may not be interpreted in an idealized or overly formal sense unless expressly so defined herein.

Exemplary embodiments are described herein with reference to cross-sectional illustrations that are schematic illustrations. As such, variations from the shapes of the illustrations as a result, for example, of manufacturing techniques and/or tolerances, are to be expected. Thus, embodiments described herein should not be construed as being limited to the particular shapes of regions as illustrated herein but are to include deviations in shapes that may result, for example, from the manufacturing techniques and/or tolerances. For example, a region illustrated or described as flat may typically have rough and/or nonlinear features. Moreover, sharp angles that are illustrated may be rounded. Thus, the regions illustrated in the figures are schematic in nature, and their shapes are not intended to illustrate the precise shape of a region and are not intended to limit the scope of the present disclosure.

FIG. 1 is a schematic block diagram of a liquid crystal display (LCD) device, according to an exemplary embodiment of the present disclosure. An LCD device 1000 includes a display area DA and a non-display area (not illustrated). The display area DA is an area where an image is viewed, and the non-display area is an area where no image is viewed. The periphery of the display area DA may be surrounded by the non-display area.

The display area DA includes a plurality of gate lines GL that extend in one direction (for example, a row direction), a plurality of data lines DL that extend in another direction (for example, a column direction) intersecting the direction in which the gate lines GL extend, and a plurality of pixels PX that are formed at the intersections between the gate lines GL and the data lines DL. The pixels PX may be arranged in the row direction and the column direction, substantially in a matrix form. Each of the pixels PX may uniquely display one of primary colors to realize a color display. Examples of the primary colors may include, but are not limited to, red, green, and blue colors.

The non-display area may be a light-shielding area. In the non-display area of the LCD device 1000, a gate driver 800 that provides a gate signal to the pixels PX in the display area DA, a data driver 900 that provides a data signal, and a timing controller 700 that controls the gate driver 800 and the data driver 900 may be provided. The gate lines GL and the data lines DL may extend beyond the display area DA into the non-display area and may be electrically connected to the gate driver 800 and the data driver 900. The gate driver 800 and the data driver 900 may be electrically connected to the timing controller 700.

The timing controller 700 may receive various signals from an external source (not illustrated) and control the gate driver 800 and the data driver 900 using the received signals. For example, the timing controller 700 may receive an input image signal RGB and input control signals CS for controlling the display based on the input image signal RGB from an external graphic controller (not illustrated), and may output a gate driver control signal GDC, a data driver control signal DDC, and an image data signal DATA.

The input image signal RGB may include luminance information for each of the pixels PX. Luminance may have a predefined number of gray levels, for example, 1024, 256 or 64 gray levels, but the present disclosure is not limited thereto. The input image signal RGB may be divided into one or more frames.

The input control signals CS received by the timing controller 700 may include a vertical synchronization signal $V_{sync}$, a horizontal synchronization signal $H_{sync}$, a clock signal CLK, and a data enable signal DE, but the present disclosure is not limited thereto. In some embodiments, the input control signals CS may also include other signals than those set forth herein.

The gate driver 800 may generate a gate signal that includes a gate voltage for activating each of the pixels PX in the display area DA based on a gate pulse, according to the gate driver control signal GDC and may transmit the gate signal to the gate lines GL.

The data driver 900 may generate a data signal that includes a data voltage, according to the image data signal DATA and the data driver control signal DDC, and may transmit the data signal to the data lines DL. The polarity of the data voltage may be varied on a frame-by-frame basis.

Figure 2:
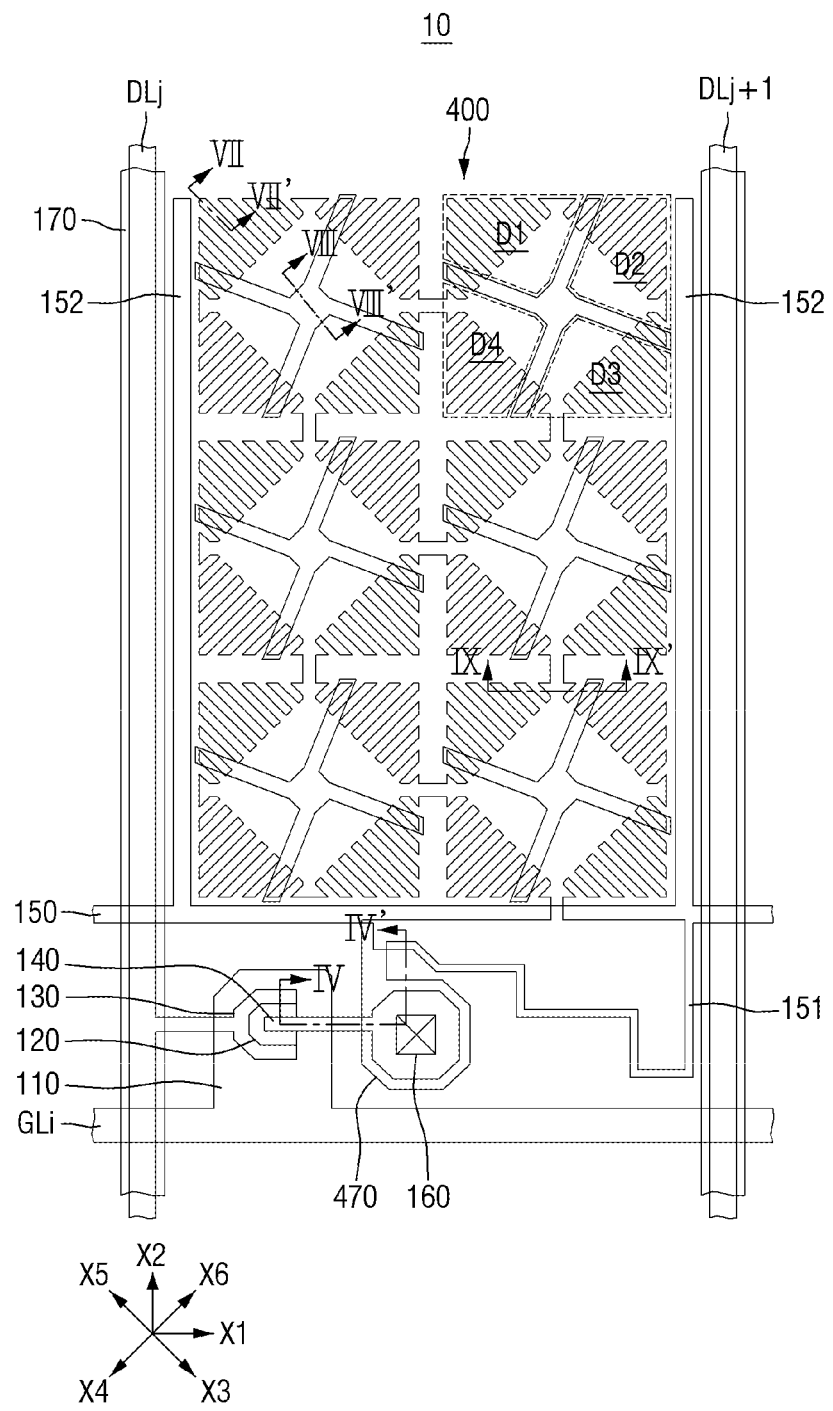
FIG. 2 is a plan view of a pixel of the LCD device of FIG. 1.
Figure 3:
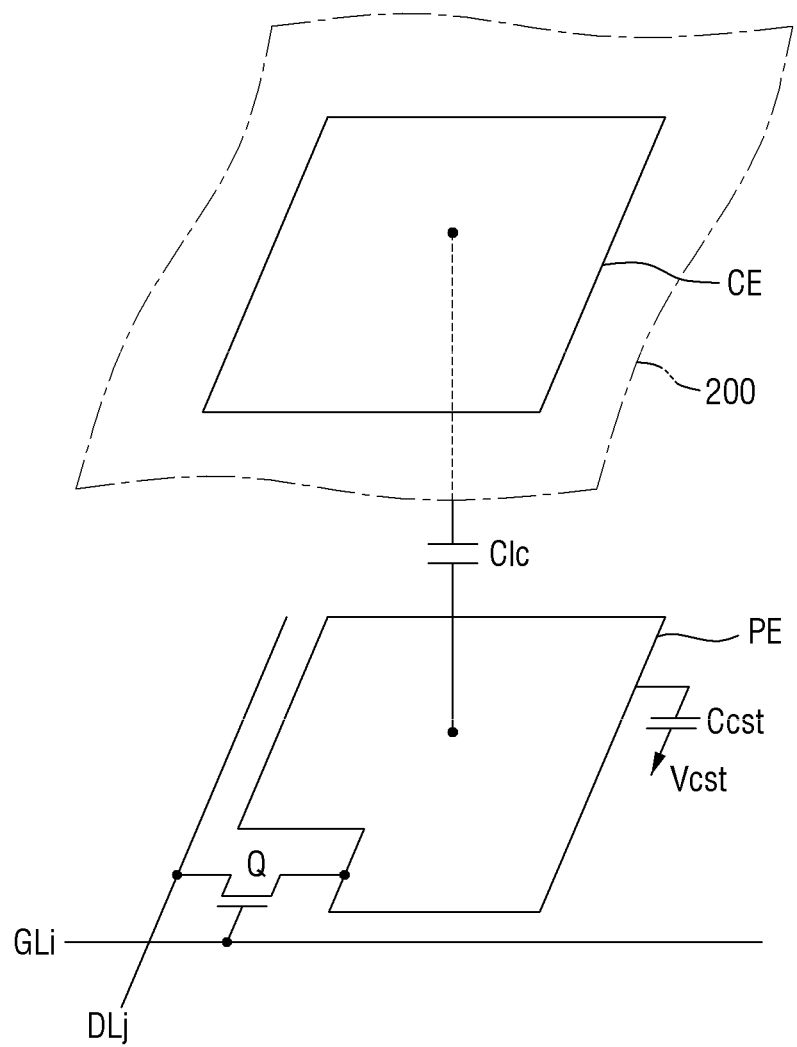
FIG. 3 is an equivalent circuit diagram of the pixel of FIG. 2.
Figure 4:
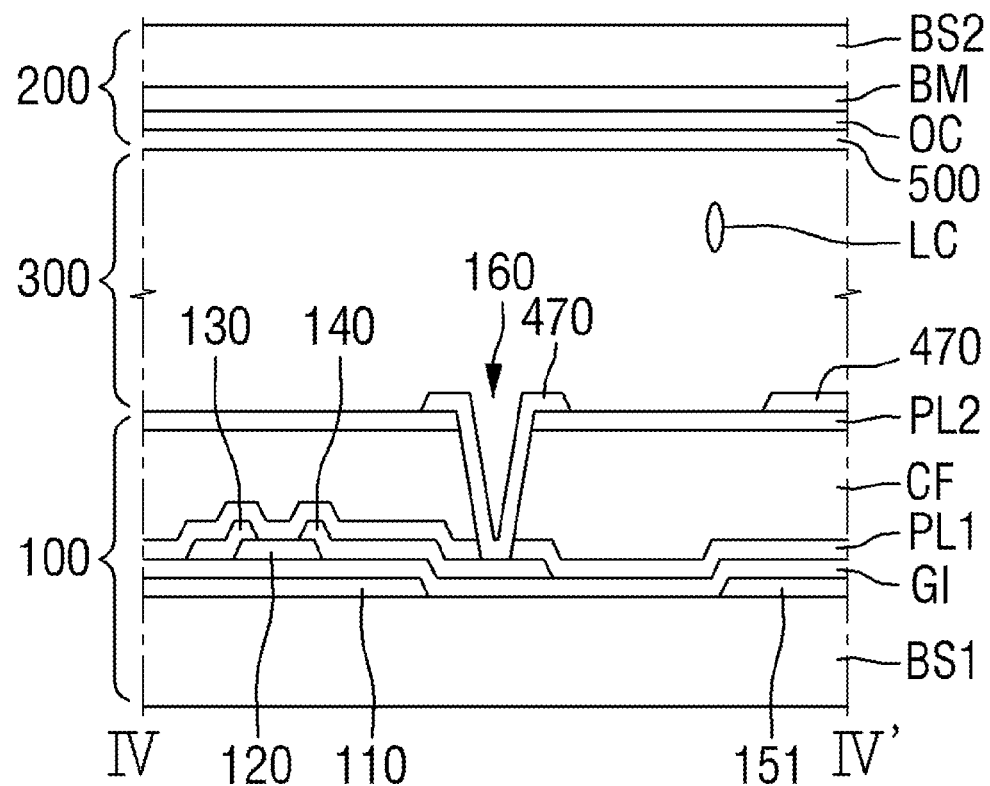
FIG. 4 is a cross-sectional view taken along line IV-IV' of FIG. 2.

FIG. 2 is a plan view of a pixel of the LCD device 1000 of FIG. 1. FIG. 3 is an equivalent circuit diagram of the pixel of FIG. 2. FIG. 4 is a cross-sectional view taken along line IV-IV' of FIG. 2.

Referring to FIGS. 2 and 3, a pixel 10 includes a switching device Q and a liquid crystal capacitor Clc. The switching device Q may be a thin-film transistor (TFT) including three terminals. A control terminal of the switching device Q may be connected to a gate line GLi, an input terminal of the switching device Q may be connected to a data line DLj, and an output terminal of the switching device Q may be connected to a first terminal of the liquid crystal capacitor Clc.

The liquid crystal capacitor Clc may have two terminals including a pixel electrode PE to which a data voltage is applied and a common electrode CE to which a common voltage is applied. A liquid crystal layer is interposed between the pixel electrode PE and the common electrode CE as a dielectric body of the liquid crystal capacitor Clc. More specifically, in response to a gate signal being applied to the gate line GLi, the switching device Q that is connected to the gate line GLi, is turned on. When the switching device Q is turned on, a data voltage provided by the data line DLj may be applied to the pixel electrode PE that is the first terminal of the liquid crystal capacitor Clc. The liquid crystal capacitor Clc is charged with a voltage corresponding to the difference between the data voltage and the common voltage and thus to control the liquid crystal layer.

Referring to FIGS. 2 and 4, the LCD device 1000 includes a first substrate 100, a second substrate 200 that is spaced from and faces the first substrate 100, and a liquid crystal layer 300 that is interposed between the first substrate 100 and the second substrate 200. The liquid crystal layer 300 may include liquid crystal molecules LC having negative dielectric anisotropy.

The first substrate 100 may be a lower substrate on which a TFT is formed. The first substrate 100 includes a first base substrate BS1. The first base substrate BS1 may be a transparent or opaque insulating substrate. For example, the first base substrate BS1 may be a silicon substrate, a glass substrate, or a plastic substrate.

The gate line GLi may be disposed on the first base substrate BS1 to extend substantially in a first direction X1. A gate electrode 110 may protrude upward from the gate line GLi.

A sustain electrode line 150 is disposed on the same layer as the gate line GLi and extends substantially in parallel to the gate line GLi. The sustain electrode line 150 may include a first sustain electrode 151 and two second sustain electrodes 152 that protrude from the sustain electrode line 150. The first sustain electrode 151 may protrude downward from the sustain electrode line 150 to be overlapped by a protruding portion 470 of a pixel electrode 400. Accordingly, the first sustain electrode 151 may form a sustain capacitor along with the protruding portion 470 of the pixel electrode 400 that is formed above the first sustain electrode 151 to overlap the first sustain electrode 151, and a plurality of passivation films that are formed between the first sustain electrode 151 and the pixel electrode 400. The second sustain electrodes 152 may protrude upward from the sustain electrode 150 to surround the left and right sides of the pixel electrodes 400. In some exemplary embodiments, the sustain electrode line 150, the first sustain electrode 151, and/or the second sustain electrodes 152 may be omitted, or the shapes and the arrangement of the sustain electrode line 150, the first sustain electrode 151, and/or the second sustain electrodes 152 may be varied.

A gate insulating layer GI is disposed on the entire surface of the first base substrate BS1 where the gate line GLi and the sustain electrode 150 are formed. The gate insulating layer GI may be formed of an insulating material to electrically insulate the overlying layers and the underlying layers from each other. The gate insulating layer GI may be formed of, for example, silicon nitride ($SiN_x$), silicon oxide ($SiO_x$), silicon nitride oxide ($SiN_xO_y$), or silicon oxynitride ($SiO_xN_y$).

A plurality of data lines (DLj and DLj+1) including a semiconductor layer 120 and the data line DLj are disposed on the gate insulating layer GI. The plurality of data lines (DLj and DLj+1) may extend substantially in a second direction X2 and intersect the gate line GLi.

The semiconductor layer 120 is disposed in an area of overlap with the gate electrode 110. The semiconductor layer 120 may form a channel of a TFT. The semiconductor layer 120 may include a semiconductor material such as amorphous silicon or an oxide semiconductor, and may allow or block the transmission of a current according to a voltage provided to the gate electrode 110.

A source electrode 130 and a drain electrode 140 are disposed on the semiconductor layer 120 to at least partially overlap the semiconductor layer 120. An ohmic contact layer (not illustrated) may be disposed between the semiconductor layer 120 and the source and drain electrodes 130 and 140. The ohmic contact layer may be formed of a semiconductor material doped with impurities.

The source electrode 130 may be formed to protrude from the data line DLj toward the gate electrode 110. The source electrode 130 may surround at least a part of the drain electrode 140. For example, the source electrode 130 may be C-shaped, U-shaped, inverse C-shaped, or inverse U-shaped. The drain electrode 140 may be formed to be spaced from the source electrode 130 over the gate electrode 110 and the semiconductor layer 120. The drain electrode 140 may be electrically connected to the protruding portion 470 of the pixel electrode 400 via a contact hole 160.

The gate electrode 110, the semiconductor layer 120, the source electrode 130, and the drain electrode 140 form a TFT. More specifically, the gate electrode 110 that is the control terminal of the switching device Q is connected to the gate line GLi, the source electrode 130 that is the input terminal of the switching device Q is connected to the data line DLj, and the drain electrode 140 that is the output terminal of the switching device Q is connected to the pixel electrode 400. The functions of the switching device Q are described above with reference to FIG. 3.

A passivation layer including a first passivation film PL1, a color filter CF, and a second passivation film PL2 may be formed on the entire surfaces of the plurality of data lines (DLj and DLj+1) and the switching device Q. The passivation layer may be provided as an organic layer and/or an inorganic layer and may have a single-layer structure or a double-layer structure.

The first passivation film PL1 may be formed of an inorganic insulating material such as silicon nitride or silicon oxide. The first passivation film PL1 prevents the underlying wiring and electrodes from being in direct contact with an organic material such as a solvent.

The color filter CF may be disposed between the plurality of data lines (DLj and DLj+1). The color filter CF may selectively transmit light within a particular wavelength band. For example, color filters that transmit light from different wavelength bands and thus have different colors may be respectively provided in adjacent pixels. In the present exemplary embodiment, the LCD device 1000 may have a color filter-on-array (COA) structure in which the color filter CF is disposed on a TFT. However, in some other exemplary embodiments, the color filter CF may be disposed on an upper substrate. Although not specifically illustrated in the drawings, a planarization layer (not illustrated) may be disposed on the color filter CF. The planarization layer may make the heights of the elements stacked on the first base substrate BS1 uniform.

The second passivation film PL2 may be disposed on the color filter CF. The second passivation film PL2 may prevent the color filter CF from being lifted off from the underlying layers, and may suppress the contamination of the liquid crystal layer 300 by an organic material such as a solvent from the color filter CF, thereby preventing various defects, such as afterimages, that may occur the driving of the LCD device 1000.

The contact hole 160 may be formed in the first passivation film PL1, the color filter CF, the planarization layer, and the second passivation film PL2 to partially expose the drain electrode 140. The drain electrode 140 may be electrically connected to the pixel electrode 400 via the contact hole 160 and the protruding portion 470 of the pixel electrode 400.

A shielding electrode 170 and the pixel electrode 400 are disposed on the second passivation film PL2. More specifically, the shielding electrode 170 may be disposed on the second passivation film PL2, and particularly, in an area of overlap with the plurality of data lines (DLj and DLj+1) to prevent interference between electrodes that may occur due to a rapid change in the polarity of a data voltage or prevent the liquid crystal molecules LC above the plurality of data lines (DLj and DLj+1) from being directly affected by a data voltage. The shielding electrode 170 may be provided with the same voltage as, for example, the voltage applied to the sustain electrode line 150, or may be floated.

The pixel electrode 400 may form an electric field together with a common electrode 500 that is formed on the second substrate 200 to control the alignment direction of the liquid crystal molecules LC in the liquid crystal layer 300 that is interposed between the pixel electrode 400 and the common electrode 500. The pixel electrode 400 may be a transparent electrode. The pixel electrode 400 may be formed of a material such as, for example, indium tin oxide (ITO) or indium zinc oxide (IZO), but the present disclosure is not limited thereto. The shape and the arrangement of the pixel electrode 400 are described in detail with reference to FIG. 5. A lower alignment film (not illustrated) may be disposed on the pixel electrode 400 to align the liquid crystal molecules LC in the liquid crystal layer 300.

The second substrate 200 may be an upper substrate. The second substrate 200 includes a second base substrate BS2. The second base substrate BS2 may be made of the same material as the first base substrate BS1.

A light-shielding member BM and an overcoat layer OC may be disposed on the second base substrate BS2. The light-shielding member BM may be disposed along the boundary between a plurality of color filters and may prevent the occurrence of a light leakage defect. For example, the light-shielding member BM may be a black matrix. Alternatively to the exemplary embodiment illustrated in FIG. 4, the light-shielding member BM may be disposed on the first substrate 100. The overcoat layer OC may be disposed on the light-shielding member BM. The overcoat layer OC may prevent the light-shielding member BM from being detached from the second base substrate BS2 and may make the heights of the elements stacked on the second base substrate BS2 uniform.

The common electrode 500 may be disposed on the overcoat layer OC. The common electrode 500, similar to the pixel electrode 400, may be a transparent electrode. The shape and the arrangement of the common electrode 500 are described with reference to FIG. 6. An upper alignment film (not illustrated) may be disposed on the common electrode 500 to align the liquid crystal molecules LC in the liquid crystal layer 300.

Figure 5:
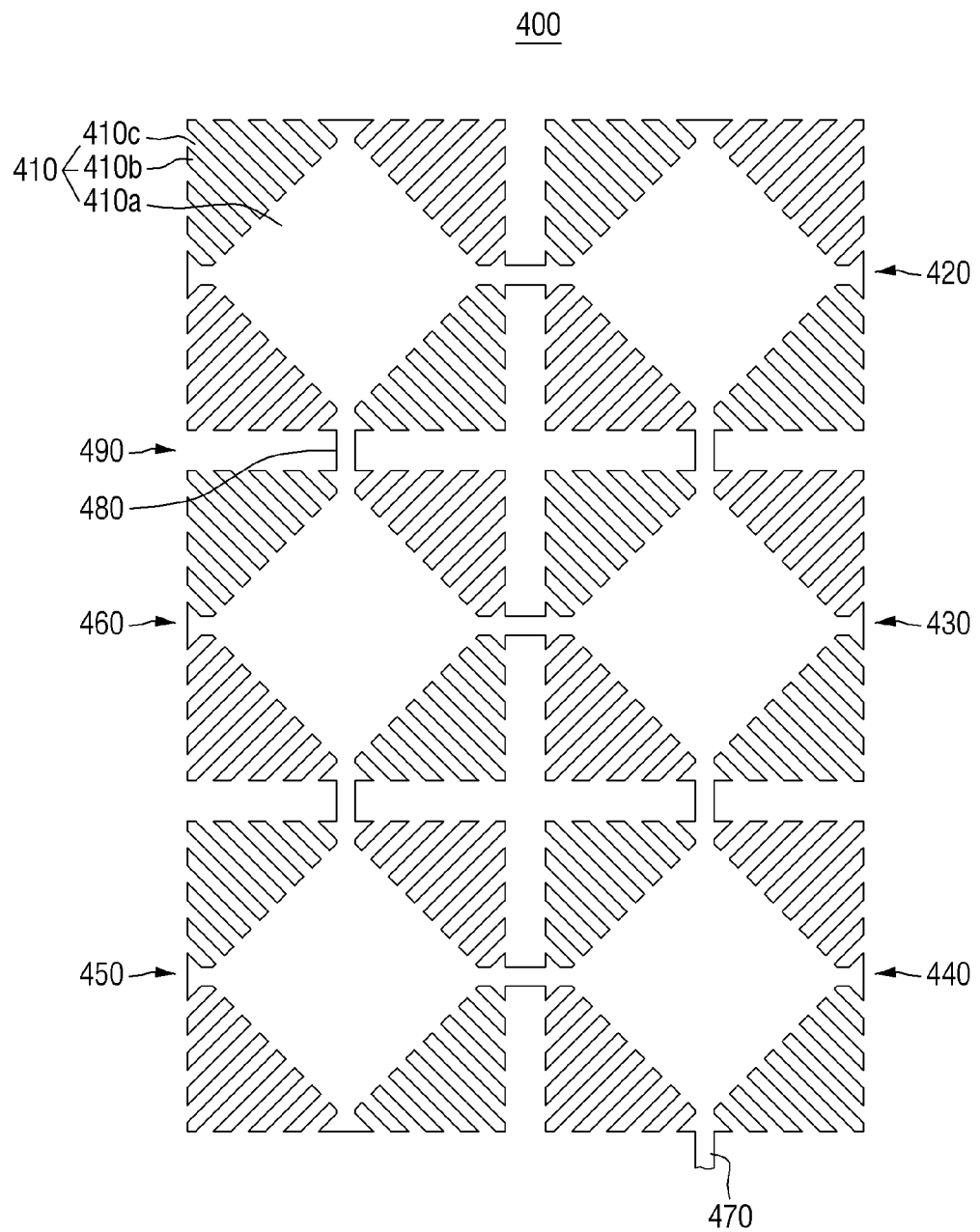
FIG. 5 is a plan view of a pixel electrode illustrated in FIG. 2.
Figure 6:
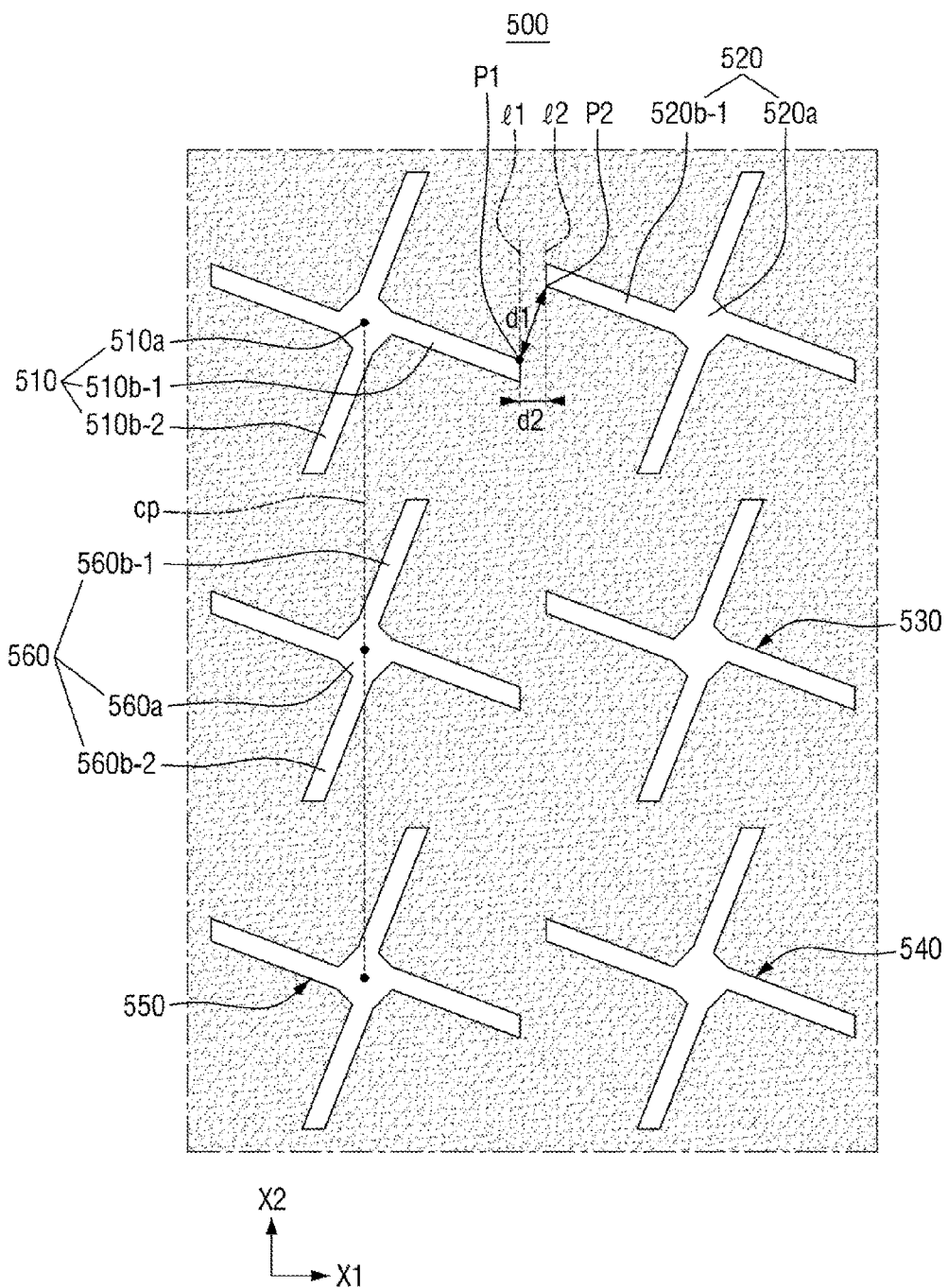
FIG. 6 is a plan view of part of a common electrode illustrated in FIG. 2.

FIG. 5 is a plan view of the pixel electrode 400 of FIG. 2. FIG. 6 is a plan view of part of the common electrode 500 of FIG. 2. Referring to FIGS. 2 and 5, the pixel electrode 400 may be generally rectangular, and may be disposed to correspond to the pixel 10. The pixel electrode 400 may include the protruding portion 470 that protrudes downward, six unit pixel electrodes, and a plurality of pixel electrode connecting portions 480 that connect the six unit pixel electrodes. The six unit pixel electrodes may be disposed in rows and columns in a matrix form, and may form a matrix with the unit pixel electrodes of a neighboring pixel electrode. That is, the unit pixel electrodes may be arranged in rows and columns in a matrix form throughout the display area DA, and the distance between each rows or each columns may differ at least partially from regions. FIG. 5 illustrates the pixel electrode 400 including two unit pixel electrodes in a row direction and three unit pixel electrodes in a column direction. Alternatively, the pixel electrode 400 may include only one unit pixel electrode, two, four, eight unit pixel electrodes, or more than eight unit pixel electrodes. In the present exemplary embodiment, the six pixel electrodes of the pixel electrode 400 are referred to as the first, second, third, fourth, fifth, and sixth unit pixel electrodes 410, 420, 430, 440, 450, and 460, respectively, clockwise from the upper left unit pixel electrode. Gaps 490 are formed among the first, second, third, fourth, fifth, and sixth unit pixel electrodes 410, 420, 430, 440, 450, and 460. The first, second, third, fourth, fifth, and sixth unit pixel electrodes 410, 420, 430, 440, 450, and 460 may have substantially the same shape and arrangement.

The first unit pixel electrode 410 may be a pattern electrode with slit patterns. The slit patterns of the first unit pixel electrode 410 may include a body portion 410a, a plurality of branch portions 410b that extend from the sides of the body portion 410a, and a plurality of slit portions 410c that are disposed among the branch portions 410b.

The body portion 410a may be located substantially at the center of the first unit pixel electrode 410 and may be rhombus-shaped, but the present disclosure is not limited thereto. In other embodiments, the body portion 410a may be polygonal, other than rhombus-shaped, or may be cross-shaped. In the present exemplary embodiment, the body portion 410a is a rhombus having four right angles. The larger the area of the body portion 410a is, the higher the transmittance of the pixel 10 becomes, thereby increasing the luminance of the pixel 10. The planar area of the body portion 410a may account for about half the planar area of the first unit pixel electrode 410, but the present disclosure is not limited thereto. By varying the area of the body portion 410a according to a required specification, the luminance properties of the body portion 410a may be controlled. Four corner portions of the body portion 410a may be protruded and expanded. The expanded corner portions of the body portion 410a may be disposed adjacent to the sides of the first unit pixel electrode 410, and the sides of the body portion 410a may form an angle of about 45° with the sides of the first unit pixel electrode 410.

The branch portions 410b may extend radially in a direction substantially perpendicular to the sides of the body portion 410a, i.e., in a direction of about 45° from the center of the first unit pixel electrode 410. Due to the branch portions 410b and the slit portions 410c among the branch portions 410b included in the first unit pixel electrode 410, the control over the liquid crystal molecules LC with a fringe field may be strengthened, thereby enhancing the response speed of the LCD device 1000 and improving afterimages.

The first unit pixel electrode 410 may include four domains that differ from one another in the direction in which the branch portions 410b extend. The four domains are hereinafter referred to as the first, second, third, and fourth domains D1, D2, D3, and D4, respectively, clockwise from the upper left domain. Each of the four domains D1, D2, D3, and D4 may serve to direct the liquid crystal molecules LC and allow the alignment direction of the liquid crystal molecules LC to vary. For example, the liquid crystal molecules LC may be aligned substantially in a third direction X3 in the first domain D1, substantially in a fourth direction X4 in the second domain D2, substantially in a fifth direction X5 in the third domain D3, and substantially in a sixth direction X6 in the fourth domain D4. Accordingly, the viewing angle of the LCD device 1000 may increase, the texture of the LCD device 1000 may decrease, and the transmittance and the response speed of the LCD device 1000 may be improved. The principles of the formation of the first through fourth domains D1 through D4 are described in detail with reference to FIGS. 7 through 9.

The first, second, third, fourth, fifth, and sixth unit pixel electrodes 410, 420, 430, 440, 450, and 460 may be connected to one another by the pixel electrode connecting portions 480. The same voltage may be applied to the first, second, third, fourth, fifth, and sixth unit pixel electrodes 410, 420, 430, 440, 450, and 460, and a total of 24 domains (i.e., four domains in each of the first, second, third, fourth, fifth, and sixth unit pixel electrodes 410, 420, 430, 440, 450, and 460 that correspond to four directions) may be formed in the pixel electrode 400. Since the pixel electrode 400 has as many as 24 domains, a control over the liquid crystal molecules LC may be strengthened, and the transmittance may be improved. Each of the pixel electrode connecting portions 480 may be located on a line that connects the body portions 410a of each pair of adjacent unit pixel electrodes.

Referring to FIG. 4, the protruding portion 470 may be disposed below the fourth unit pixel electrode 440, and may be electrically connected to the drain electrode 140 via the contact hole 160.

The shape of the first, second, third, fourth, fifth, and sixth unit pixel electrodes 410, 420, 430, 440, 450, and 460 is exemplary, and the first, second, third, fourth, fifth, and sixth unit pixel electrodes 410, 420, 430, 440, 450, and 460 may be modified to have various shapes of body portions, branch portions, and extension portions, other than those set forth herein, to vary the transmittance and the liquid crystal control of the LCD device 1000.

The common electrode 500 is described with reference to FIGS. 2 and 6. The common electrode 500 may be disposed on substantially the entire surface of the display area DA, but for convenience, only a portion of the common electrode 500 overlapping the pixel 10 is hereinafter described.

The common electrode 500 may include six slits 510, 520, 530, 540, 550, and 560. The six slits 510, 520, 530, 540, 550, and 560 may be disposed in rows and columns in a matrix form. The common electrode 500 may include a plurality of slits that are arranged in rows and columns in the matrix form throughout the display area DA, and the distance between each rows or each columns may differ at least partially from regions. FIG. 6 illustrates the common electrode 500 including two slits in the row direction and three slits in the column direction. In the present exemplary embodiment, the six slits are referred to as the first, second, third, fourth, fifth, and sixth slits 510, 520, 530, 540, 550, and 560, respectively, clockwise from the upper left slit.

The common electrode 500 may receive a common voltage and may form the first terminal of the liquid crystal capacitor Clc. Every two adjacent slits among the first, second, third, fourth, fifth, and sixth slits 510, 520, 530, 540, 550, and 560 may be spaced from each other having a gap with a predetermined width therebetween. Since every two adjacent slits among the first, second, third, fourth, fifth, and sixth slits 510, 520, 530, 540, 550, and 560 are spaced from each other, no parts of the common electrode 500 may be electrically isolated. The width among the first, second, third, fourth, fifth, and sixth slits 510, 520, 530, 540, 550, and 560 may allow the common voltage that is provided from the non-display area to be uniformly transmitted to the entire surface of the common electrode 500. As the width among the first, second, third, fourth, fifth, and sixth slits 510, 520, 530, 540, 550, and 560 increases, the resistance of the common electrode 500 may be sufficiently reduced, thereby preventing regional increases in the resistance of the common electrode 500.

The first, second, third, fourth, fifth, and sixth slits 510, 520, 530, 540, 550, and 560 may be disposed to correspond to the first, second, third, fourth, fifth, and sixth unit pixel electrodes 410, 420, 430, 440, 450, and 460 and may improve a control over the liquid crystal molecules LC together with the branch portions and the body portions of each of the first, second, third, fourth, fifth, and sixth unit pixel electrodes 410, 420, 430, 440, 450, and 460.

For example, the first slit 410 may be formed in an area substantially overlapping the first unit pixel electrode 410. The first slit 510 may include a first central portion 510a and one or more extension portions that extend from the first central portion 510a.

The first central portion 510a may be located substantially at the center of the first slit 510 and may be rhombus-shaped, but the present disclosure is not limited thereto. In other embodiments, the first central portion 510a may be polygonal instead of being rhombus-shaped, conforming to the shape of the body portion 410a of the first unit pixel electrode 410. The sides of the first central portion 510a may be formed to be substantially in parallel to the sides of the body portion 410a, thereby maximizing a fringe field between the first unit pixel electrode 410 and the common electrode 500. In some exemplary embodiments, the planar area of the first central portion 510a may be smaller than the planar area of the body portion 410a.

For the first central portion 510a that is rhombus-shaped, four extension portions may respectively extend in straight lines from the four corners of the first central portion 510a. The width of the extension portions may be about 4 μm to about 5 μm. Two extension portions surrounding the first domain D1 and the branch portions 410b of the first unit pixel electrode 410 that form the first domain D1 may form a strong fringe field therebetween, thereby facilitating a control of the liquid crystal molecules LC and improving the viewing angle properties of the LCD device 1000. The lengths of the extension portions surrounding each domain may be proportional to the intensity of a fringe field and the control over the liquid crystal molecules LC. Accordingly, securing long extension portions is directly related to the display quality of the LCD device 1000.

Among the four extension portions of the first slit 510, the extension portion that extends toward the second slit 520 that is disposed adjacent to the first slit 510 in the first direction X1 is hereinafter referred to as a first extension portion 510b-1 of the first slit 510. In addition, among the four extension portions of the second slit 520, the extension portion that extends toward the first slit 510 is hereinafter referred to as a first extension portion 520b-1 of the second slit 520. The end of the first extension portion 510b-1 of the first slit 510 is spaced from the end of the first extension portion 520b-1 of the second slit 520. A first distance d1 that is the shortest distance between the end of the first extension portion 510b-1 of the first slit 510 and the end of the first extension portion 520b-1 of the second slit 520 may be about 5 μm or larger. If a width between a pair of adjacent slits, e.g., the first distance d1, is less than about 5 μm, a pattern defect in which the extension portions of the pair of adjacent slits are not spaced, but connected together, may occur due to, for example, an over-etch of the common electrode 500. In addition, damage to the pattern of the common electrode 500 may be continued due to resistance heat that may be generated during the driving of the LCD device 1000.

A point at which a line defining the first distance d1 and the first extension portion 510b-1 of the first slit 510 meet is defined as a first point P1, and a point at which the line defining the first distance d1 and the first extension portion 520b-1 of the second slit 520 meet is defined as a second point P2. A second distance d2 that is the horizontal distance between the first and second points P1 and P2 in the first direction X1 may be shorter than the first distance d1. The second distance d2 between the first and second points P1 and P2 may denote the distance between an imaginary line 11 that is drawn in a direction perpendicular to the first direction X1 to pass through the first point P1 and an imaginary line 12 that is drawn in parallel to the imaginary line 11 to pass through the second point P2. The arrangement and the shape of the first slit 510 and the second slit 520 may be directly applicable to the first slit 510 and the sixth slit 560 that is disposed adjacent to the first slit 510 in the second direction X2.

Among the four extension portions of the first slit 510, the extension portion that extends toward the sixth slit 560 that is disposed adjacent to the first slit 510 in the second direction X2, is hereinafter referred to as a second extension portion 510b-2 of the first slit 510. In addition, among the four extension portions of the sixth slit 560, the extension portion that extends toward the first slit 510 is hereinafter referred to as a first extension portion 560b-1 of the sixth slit 560, and the extension portion that extends toward the fifth slit 550 is hereinafter referred to as a second extension portion 560b-2 of the sixth slit 560.

The end of the second extension portion 510b-2 of the first slit 510 may be disposed on the left side of an imaginary center line cp that connects the first central portion 510a of the first slit 510 and a sixth central portion 560a of the sixth slit 560. The end of the first extension portion 560b-1 of the sixth slit 560 may be disposed on the right side of the imaginary line cp. In addition, the end of the second extension portion 510b-2 of the first slit 510 and the end of the first extension portion 560b-1 of the sixth slit 560 may be disposed on opposite sides of the imaginary line cp in a staggered manner. The expression "the ends of two extension portions disposed on opposite sides of the imaginary center line cp in a staggered manner" may denote that an imaginary line that connects the ends of the two extension portions intersects the imaginary center line cp that connects the central portions of the two extension portions. Similarly, the end of the first extension portion 560b-1 of the sixth slit 560 and the end of the second extension portion 560b-2 of the sixth slit 560 may also be disposed on opposite sides of the imaginary line cp in a staggered manner.

The shortest distance between the end of the second extension portion 510b-2 of the first slit 510 and the end of the first extension portion 560b-1 of the sixth slit 560 may be about 5 µm or larger. The arrangement and the shape of the first slit 510 and the sixth slit 560 may be directly applicable to the first slit 510 and the second slit 520.

Referring to FIGS. 2, 5, and 6, the connecting portions 480 of the pixel electrode 400 may overlap an imaginary center line that connects the first central portion 510a of the first slit 510 and the second central portion 520a of the second slit 520. The ends of the extension portions of the first slit 510, including the first and second extension portions 510b-1 and 510b-2, may be located in the gaps 490 of the pixel electrode 400. The extension portions of the first slit 510 may extend sufficiently, but may not infiltrate into the domain of another unit pixel electrode, thereby improving a control over the liquid crystal molecules LC.

As described above, the longer the extensions of each of the first, second, third, fourth, fifth, and sixth slits 510, 520, 530, 540, 550, and 560, the stronger a control over the liquid crystal molecules LC. However, as the length of the extensions of each of the first, second, third, fourth, fifth, and sixth slits 510, 520, 530, 540, 550, and 560 increases, the distance between the extensions of neighboring slits becomes shorter, and the gap between the neighboring slits becomes narrower.

Thus, pattern defects may occur during the manufacture or the driving of the LCD device 1000. On the other hand, as the length of the extensions of each of the first, second, third, fourth, fifth, and sixth slits 510, 520, 530, 540, 550, and 560 decreases, the risk of pattern defects may decrease, but a control over the liquid crystal molecules LC may be weakened. Therefore, there is a tradeoff relationship between the risk of pattern defects and the control over the liquid crystal molecules LC. In the present exemplary embodiment, since the four extension portions of each slit are arranged in a staggered manner relative to each of the first and second directions X1 and X2, a sufficient length may be secured for extension portions that participate in the formation of a fringe field, and at the same time, the width of the gap between neighboring slits may be increased, thereby preventing pattern defects. Accordingly, both of pattern defects and a control over the liquid crystal molecules LC that are in a tradeoff relationship may be improved.

The arrangement and the shape of a plurality of slits that overlap one or more pixel regions have been described, taking the first, second, and sixth slits 510, 520, and 560 as an example. The third, fourth, and fifth slits 530, 540, and 550 may have the same shape and arrangement as the first, second, and sixth slits 510, 520, and 560.

Figure 7:
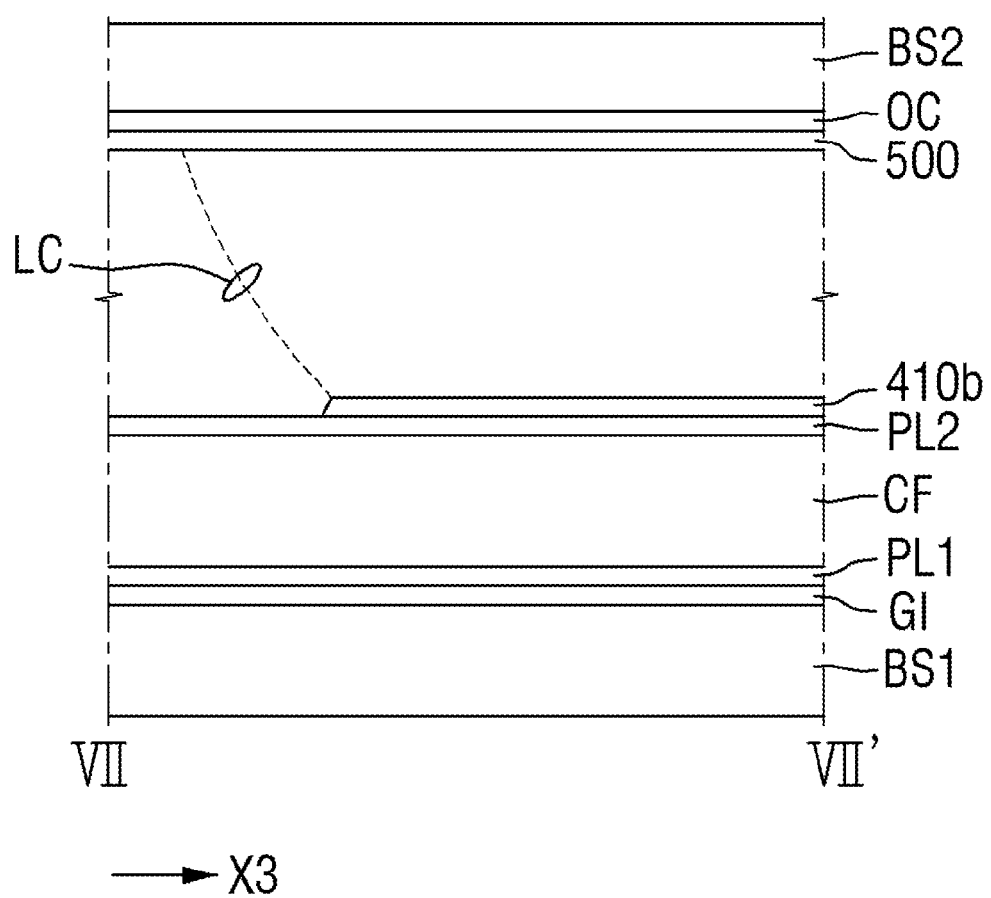
FIG. 7 is a cross-sectional view taken along line VII-VII' of FIG. 2.
Figure 8:
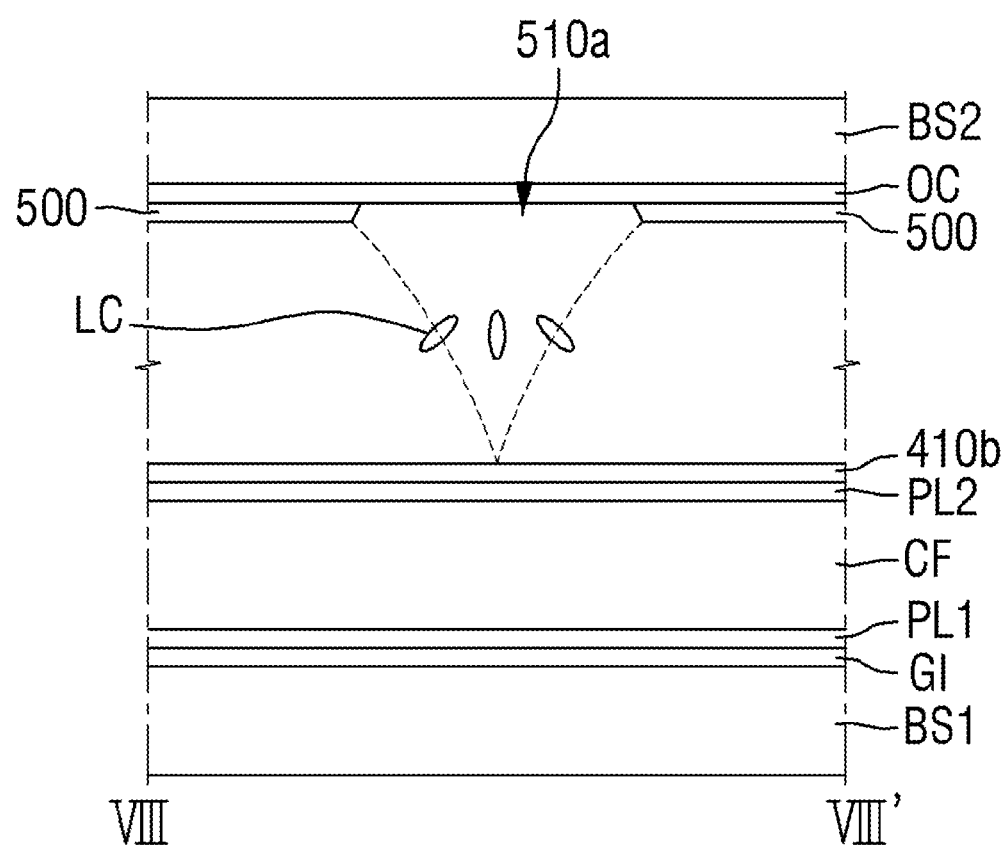
FIG. 8 is a cross-sectional view taken along line VIII-VIII' of FIG. 2.
Figure 9:
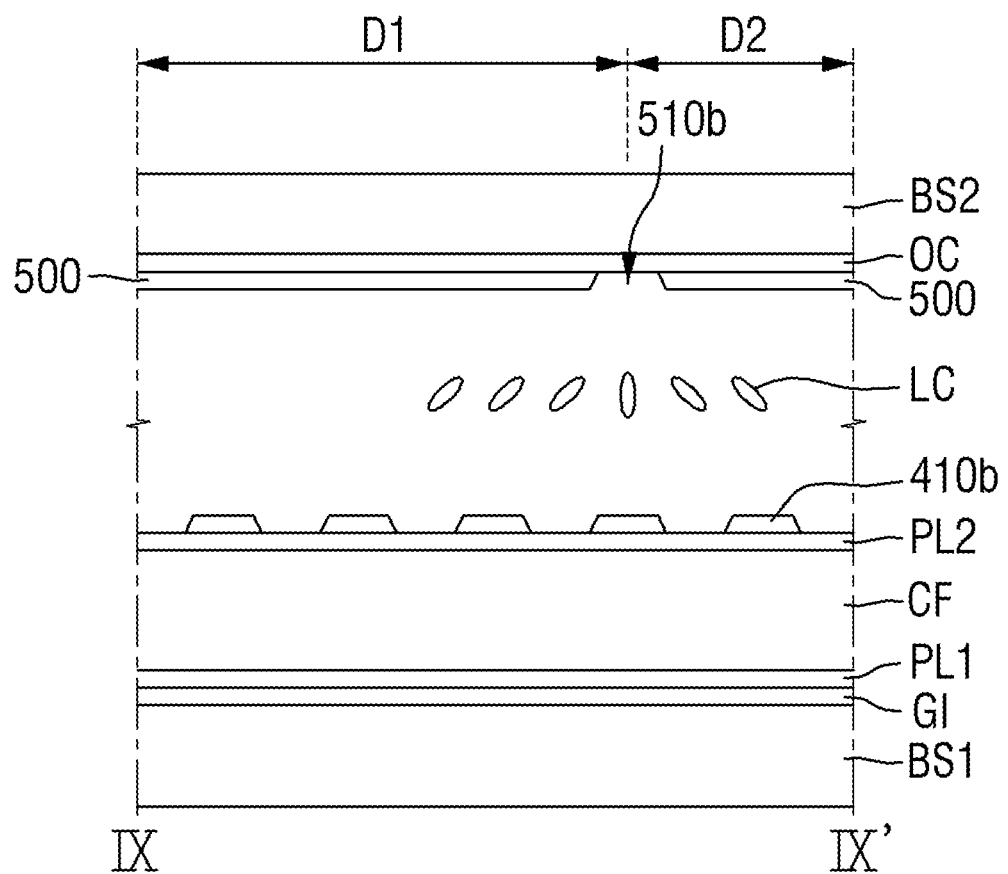
FIG. 9 is a cross-sectional view taken along line IX-IX' of FIG. 2.

The formation of a plurality of domains is hereinafter described with reference to FIGS. 2 and 7 through 9. FIG. 7 is a cross-sectional view taken along line VII-VII' of FIG. 2. FIG. 8 is a cross-sectional view taken along line VIII-VIII' of FIG. 2. FIG. 9 is a cross-sectional view taken along line IX-IX' of FIG. 2.

Referring to FIGS. 2 and 7, in response to a common voltage being applied to the common electrode 500 and a data voltage being applied to the pixel electrode 400, an electric field is formed between the common electrode 500 and the pixel electrode 400. The long axis of the liquid crystal molecules LC that are included in the liquid crystal layer 300 and have negative anisotropic dielectricity may be tilted perpendicularly to the electric field such that the alignment direction of the liquid crystal molecules LC may become substantially identical to the direction in which the branch portions 410b of the first unit pixel electrode 410 extend. Accordingly, liquid crystal molecules LC in an area near the branch portions 410b where a control over the liquid crystal molecules LC becomes the strongest may be tilted in the third direction X3 due to a strong fringe field, and their neighboring liquid crystal molecules LC may thus have the same directivity as the liquid crystal molecules LC in the area near the branch portions 410b. In this manner, a final domain direction of the whole liquid crystal molecules LC may be determined.

Referring to FIGS. 2 and 8, liquid crystal molecules LC in an area near the first central portion 510a are tilted according to the same principles as mentioned above with reference to FIGS. 2 and 7, and the alignment direction of the liquid crystal molecules LC may become substantially identical to the alignment direction of the liquid crystal molecules LC in the area near the branch portions 410b. As a result, the liquid crystal molecules LC may be generally tilted in a direction from the sides to the center of the pixel 10, and particularly, in a direction substantially parallel to the direction in which the branch portions of each of the first through fourth domains D1, D2, D3, and D4 extend. Accordingly, the alignment direction of the liquid crystal molecules LC may be varied from one domain to another domain.

Referring to FIGS. 2 and 9, the first domain D1 and the second domain D2 may be defined by an extension portion 510b of the first slit 510. The planar area of the first through fourth domains D1 through D4 defined by pivoted extension portions 510b may be the same as the planar area of the first through fourth domains D1 through D4 defined by non-pivoted extension portions 510b, thereby preventing deterioration of the viewing angle properties of the LCD device 1000.

LCD devices according to other exemplary embodiments of the present disclosure are hereinafter described, avoiding redundant description of the previous exemplary embodiments.

Figure 10:
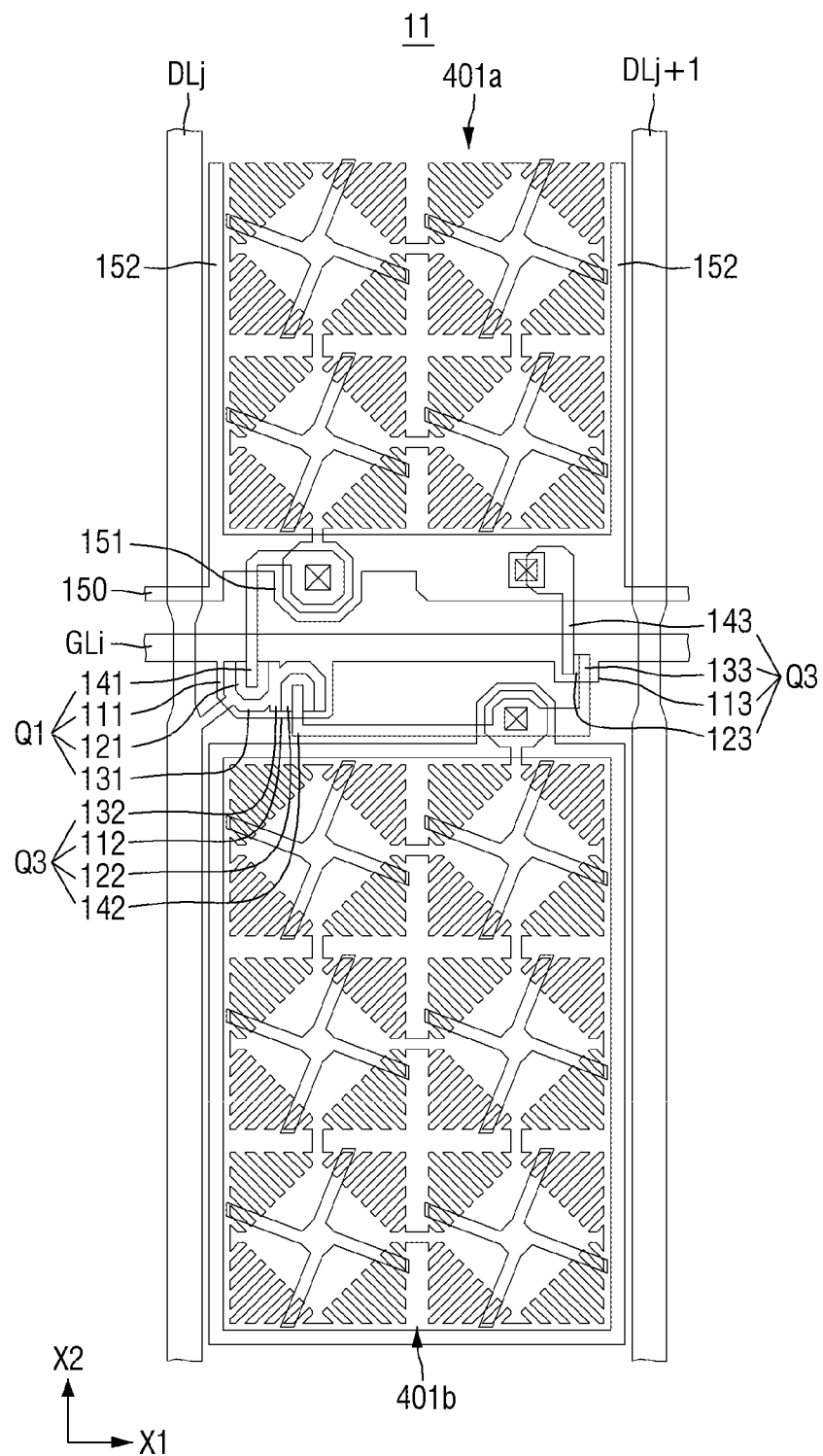
FIG. 10 is a plan view of a pixel of an LCD device, according to another exemplary embodiment of the present disclosure.

FIG. 10 is a plan view of a pixel of an LCD device, according to another exemplary embodiment of the present disclosure. A pixel 11 includes a first sub-pixel electrode 401a that defines a first sub-pixel 11a, a second sub-pixel electrode 401b that defines a second sub-pixel 11b, a common electrode 500, and first, second, and third switching devices Q1, Q2, and Q3. The first sub-pixel electrode 401a, the second sub-pixel electrode 401b, and the common electrode 500 have substantially the same shapes and arrangements as the pixel electrode 400 and the common electrode 500 of FIG. 2 except that the first sub-pixel electrode 401a includes four unit pixel electrodes and the second sub-pixel electrode 401b includes six unit pixel electrodes. The ratio of the planar area of the first sub-pixel 11a to the planar area of the second sub-pixel 11b may be about 1:2 to about 1:10.

The operation of the pixel 11 in a single frame period is hereinafter described. In response to a gate signal being applied to a gate line GLi, the first switching device Q1 is turned on. Then, a data voltage provided by a data line DLj may be applied to the first sub-pixel electrode 401a. The space (for example, the liquid crystal layer) between the first sub-pixel electrode 401a and the common electrode 500 is charged with a voltage corresponding to the difference between the data voltage and the common voltage that is higher than a voltage that the second sub-pixel 11b is to be charged with, thereby controlling liquid crystal molecules.

The second and third switching devices Q2 and Q3 that are turned on along with the first switching device Q1 may electrically connect to the data line DLj and a reference voltage line 150, and a predetermined voltage that is higher than a reference voltage but lower than the data voltage is applied to the second sub-pixel electrode 401b due to a voltage drop. Accordingly, the space between the second sub-pixel electrode 401b and the common electrode 500 is charged with a voltage that is lower than the voltage applied to the first sub-pixel 11a, thereby controlling the liquid crystal molecules.

The first sub-pixel 11a that is charged with a relatively high voltage may have poor side visibility at a low gray level when the liquid crystal molecules are vertically aligned, and the second sub-pixel 11b that is charged with a relatively low voltage may have poor side visibility at a median- or high gray level when the liquid crystal molecules are almost horizontally aligned. The voltages that the first and second sub-pixels 11a and 11b are respectively charged with may have two different gamma curves, and a gamma curve obtained by synthesizing the two different gamma curves may be perceived by a viewer as the gamma curve of a voltage that the entire pixel 11 is charged with. A synthesized gamma curve at the front of the LCD device according to the present exemplary embodiment may be made to conform to a front reference gamma curve that is determined to be most suitable. In addition, a synthesized gamma curve at the sides of the LCD device according to the present exemplary embodiment may be made to approximate as much as possible to the front reference gamma curve. By converting image data in this manner, the side visibility of the LCD device according to the present exemplary embodiment may be further improved.

Figure 11:
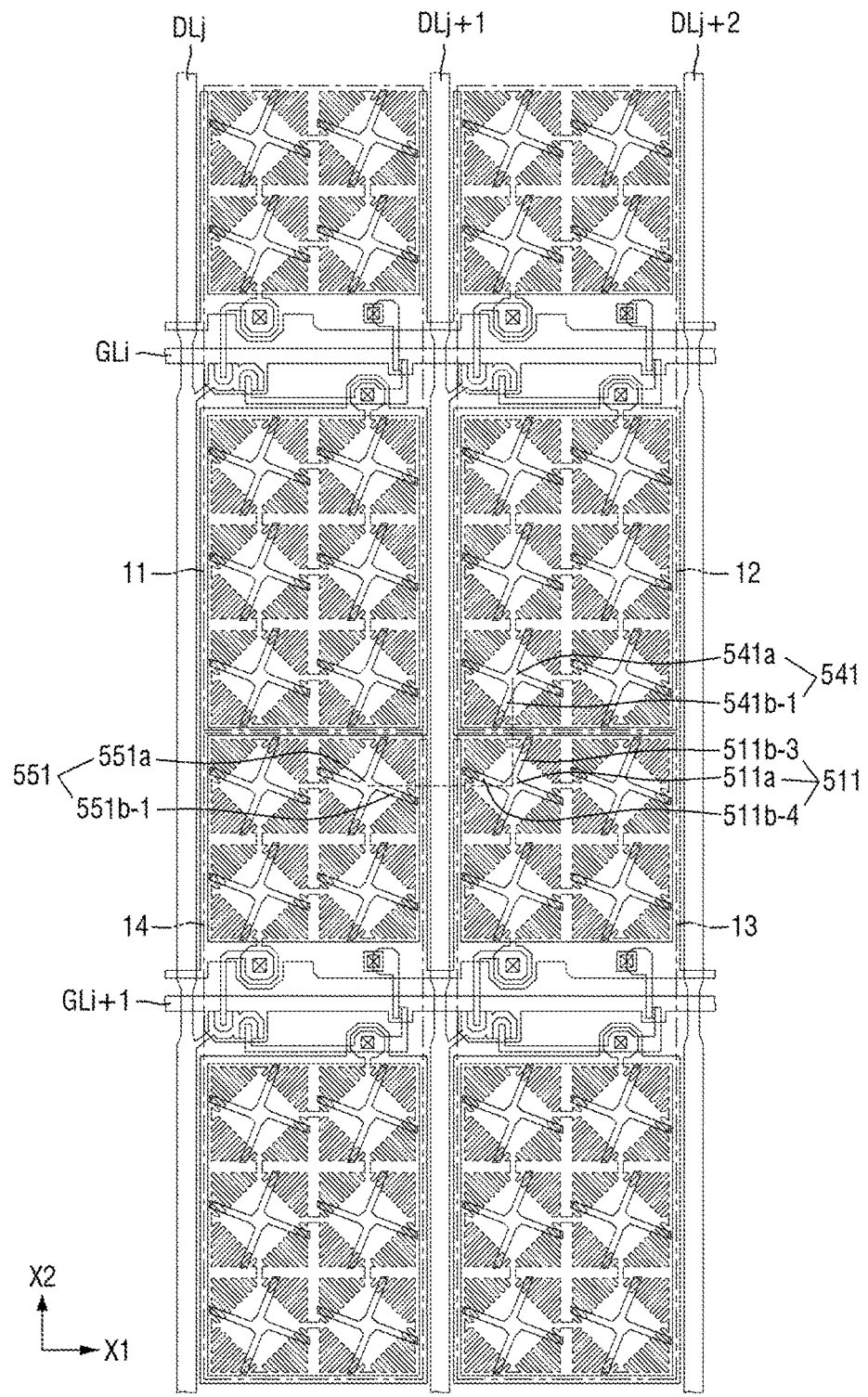
FIG. 11 is a plan view of a plurality of pixels including the pixel of FIG. 10.

FIG. 11 is a plan view of a plurality of pixels including the pixel 11 of FIG. 10. Referring to FIGS. 10 and 11, the common electrode 500 includes a plurality of slits. The slits may be arranged in rows and columns in a matrix form, and the distance between each rows or each columns may differ at least partially from regions. FIG. 11 illustrates a total of four pixels including two pixels in each row and two pixels in each column, and each of the four pixels includes two slits in each row and five slits in each column. In the exemplary embodiment of FIGS. 10 and 11, the four pixels are hereinafter referred to as the first, second, third, and fourth pixels 11, 12, 13, and 14, respectively, clockwise from the upper left pixel.

A first slit 511 overlapping the third pixel 13 includes a first central portion 511a and a third extension portion 511b-3 that extends from the first central portion 511a to a fourth slit 541 that is disposed adjacent to the first slit 511 in a second direction X2. The fourth slit 541 may be formed in an area of overlap with the second pixel 12 that is disposed adjacent to the third pixel 13 in the second direction X2. The fourth slit 541 includes a fourth central portion 541a and a first extension portion 541b-1 that extends from the fourth central portion 541a toward the first slit 511. The third extension portion 511b-3 of the first slit 511 and the first extension portion 541b-1 of the fourth slit 541 may be disposed, in a staggered manner, on opposite sides of an imaginary center line (not illustrated) that connects the first central portion 511a and the fourth central portion 541a.

The first slit 511 also includes a fourth extension portion 511b-4 that extends from the first central portion 511a toward a fifth slit 551. The fifth slit 551 may be formed in an area of overlap with the fourth pixel 14 that is disposed adjacent to the third pixel 13 in a first direction X1 with a data line DLj+1 interposed therebetween. The fifth slit 551 includes a fifth central portion 551a and a first extension portion 551b-1 that extends from the fifth central portion 551a toward the first slit 511. The fourth extension portion 511b-4 of the first slit 511 and the first extension portion 551b-1 of the fifth slit 551 may be disposed, in a staggered manner, on opposite sides of an imaginary center line (not illustrated) that connects the first central portion 511a and the fifth central portion 551a.

The shortest distance between the end of the third extension portion 511b-3 of the first slit 511 and the end of the first extension portion 541b-1 of the fourth slit 541 may be about 5 μm or larger. In addition, the shortest distance between the end of the fourth extension portion 531b-4 of the first slit 511 and the end of the first extension portion 551b-1 of the fifth slit 551 may also be about 5 μm or larger.

Figure 12:
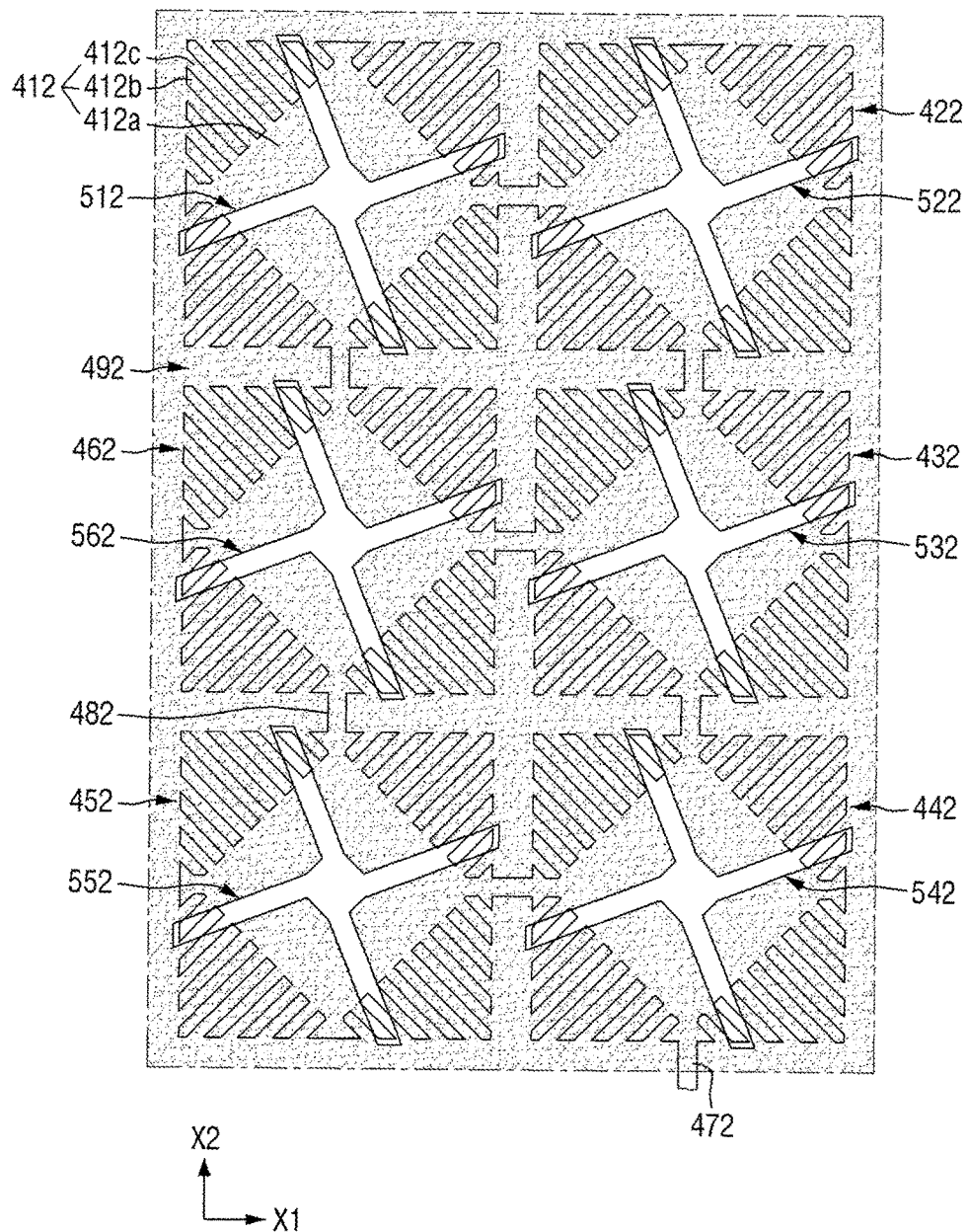
FIGS. 12 through 19 are plan views pixel electrodes and parts of common electrodes of LCD devices, according to other exemplary embodiments of the present disclosure.

FIGS. 12 through 19 are plan views pixel electrodes and parts of common electrodes of LCD devices, according to other exemplary embodiments of the present disclosure. More specifically, FIG. 12 illustrates a common electrode in which four extension portions of each of a plurality of slits 512, 522, 532, 542, 552, and 562 are misaligned leftward with respect to a first direction X1 or a second direction X2 and unit pixel electrodes 412, 422, 432, 442, 452, and 562. In the exemplary embodiment of FIG. 12, the width of the gaps between the slits 512, 522, 532, 542, 552, and 562 may increase, thereby preventing regional increases in resistance.

In some exemplary embodiments, an LCD device may include a common electrode that has both a plurality of slits that are misaligned rightward, as illustrated in FIGS. 2 and 6, and a plurality of slits that are misaligned rightward, as illustrated in FIG. 12. For example, the slits that are misaligned rightward, as illustrated in FIG. 2, may be provided in the left half of a display area, and the slits that are misaligned leftward, as illustrated in FIG. 12, may be provided in the right half of the display area, or vice versa. Accordingly, an LCD device may be designed to secure suitable visibility properties for viewing from a position that left or right of an oblique direction with respect to normal line of the LCD device panel surface.

Figure 13:
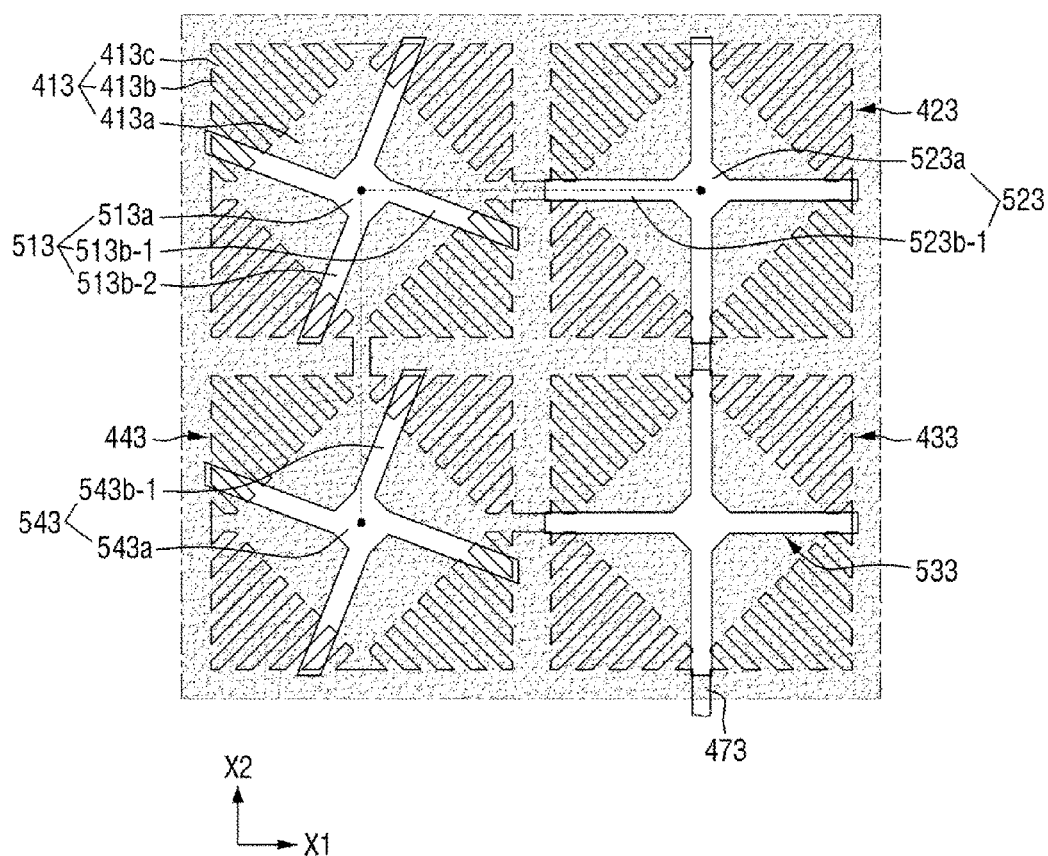
Figure 14:
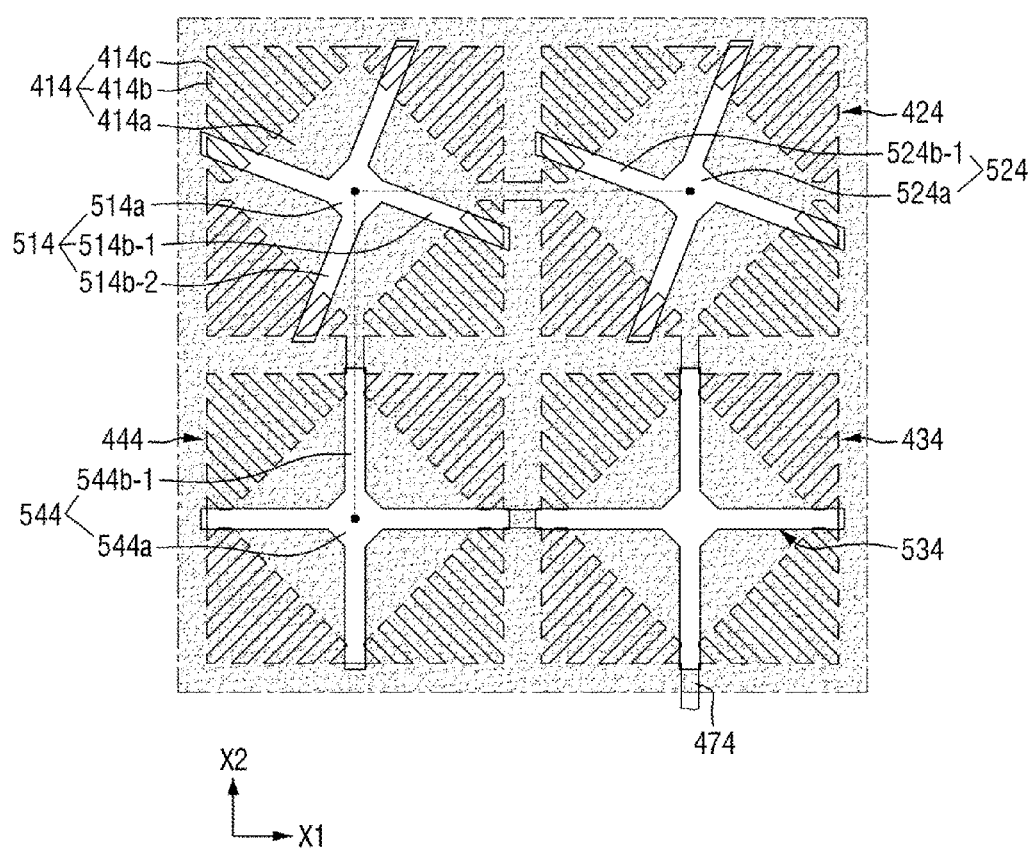

FIGS. 13 and 14 illustrate a common electrode in which four unit pixel electrodes are formed in two rows and two columns, and four slits are formed in the two rows and the two columns. In the exemplary embodiments of FIGS. 13 and 14, the four unit pixels are hereinafter referred to as the first, second, third, and fourth unit pixel electrodes, respectively, clockwise from the upper left unit pixel electrode, and the four slits are hereinafter referred to as the first, second, third, and fourth slits 513, 523, 533, and 543, respectively, clockwise from the upper left slit.

Referring to FIG. 13, the fourth slit 543 that belongs to the same column (i.e., a left column) as the first slit 513 may have the same shape as the first slit 513, and the third slit 533 that belongs to the same column (i.e., a right column) as the second slit 523, may have the same shape as the second slit 523.

Among the four extension portions of the first slit 513, the extension portion that extends toward the second slit 523 that is disposed adjacent to the first slit 513 in a first direction X1 is hereinafter referred to as a first extension portion 513b-1 of the first slit 513, and the extension portion that extends toward the fourth slit 543 that is disposed adjacent to the first slit 513 in a second direction X2 is hereinafter referred to as a second extension portion 513b-2 of the first slit 513.

Among the four extension portions of the second slit 523, the extension portion that extends toward the first slit 513 is hereinafter referred to as a first extension portion 523b-1 of the second slit 523. Among the four extension portions 543b of the fourth slit 543, the extension portion that extends toward the first slit 513 is hereinafter referred to as a first extension portion 543b-1 of the fourth slit 543.

The end of the first extension portion 513b-1 of the first slit 513 is disposed below an imaginary center line that connects a first central portion 513a of the first slit 513 and a second central portion 523a of the second slit 523. The end of the first extension portion 523b-1 of the second slit 523 may overlap the imaginary center line that connects the first central portion 513a and the second central portion 523a. The end of the second extension portion 513b-2 of the first slit 513 is disposed on the left side of an imaginary center line that connects the first central portion 513a of the first slit 513 and a fourth central portion 543a of the fourth slit 543. The end of the first extension portion 543b-1 of the fourth slit 543 may be disposed on the right side of the imaginary center line that connects the first central portion 513a and the fourth central portion 543a. The shortest distance between the end of the first extension portion 513b-1 of the first slit 513 and the end of the first extension portion 523b-1 of the second slit 523 may be about 5 μm or larger. In addition, the shortest distance between the end of the second extension portion 523b-2 of the second slit 523 and the end of the first extension portion 543b-1 of the fourth slit 543 may be about 5 μm or larger. Even though only some of the first, second, third, and fourth slits 513, 523, 533, and 543 are pivoted, a distance of a minimum of 5 μm may be secured between two adjacent slits.

Referring to FIG. 14, a second slit 524 that belongs to the same row (i.e., an upper row) as a first slit 514 may have the same shape as the first slit 514, and a third slit 534 that belongs to the same row (i.e., a lower row) as a fourth slit 544 may have the same shape as the fourth slit 544.

Among the four extension portions of the first slit 514, the extension portion that extends toward the second slit 524 that is disposed adjacent to the first slit 514 in a first direction X1 is hereinafter referred to as a first extension portion 514b-1 of the first slit 514, and the extension portion that extends toward the fourth slit 544 that is disposed adjacent to the first slit 514 in a second direction X2 is hereinafter be referred to as a second extension portion 514b-2 of the first slit 514. Among the four extension portions of the second slit 524, the extension portion that extends toward the first slit 514 is hereinafter referred to as a first extension portion 524b-1 of the second slit 524. Among four extension portions of the fourth slit 544, the extension portion that extends toward the first slit 514 is hereinafter referred to as a first extension portion 544b-1 of the fourth slit 544.

The end of the first extension portion 514b-1 of the first slit 514 may be disposed below an imaginary center line that connects a first central portion 514a of the first slit 514 and a second central portion 524a of the second slit 524. The end of the first extension portion 524b-1 of the second slit 524 may be disposed above the imaginary center line that connects the first central portion 514a and the second central portion 524a. The end of the second extension portion 514b-2 of the first slit 514 may be disposed on the left side of an imaginary center line that connects the first central portion 514a of the first slit 514 and a fourth central portion 544a of the fourth slit 544. The end of the first extension portion 544b-1 of the fourth slit 544 may overlap the imaginary center line that connects the first central portion 514a and the fourth central portion 544a. The shortest distance between the end of the first extension portion 514b-1 of the first slit 514 and the end of the first extension portion 524b-1 of the second slit 524 may be about 5 μm or larger. In addition, the shortest distance between the end of the second extension portion 514b-2 of the first slit 514 and the end of the first extension portion 544b-1 of the fourth slit 544 may be about 5 μm or larger.

In the exemplary embodiments of FIGS. 13 and 14, since only some of the slits included in a common electrode are pivoted relative to their respective central portions, a sufficient gap may be secured between slits. Since the other non-pivoted slits completely conform to the shape of their respective unit pixel electrodes, a plurality of domains capable of realizing a wide viewing angle may be formed.

Figure 15:
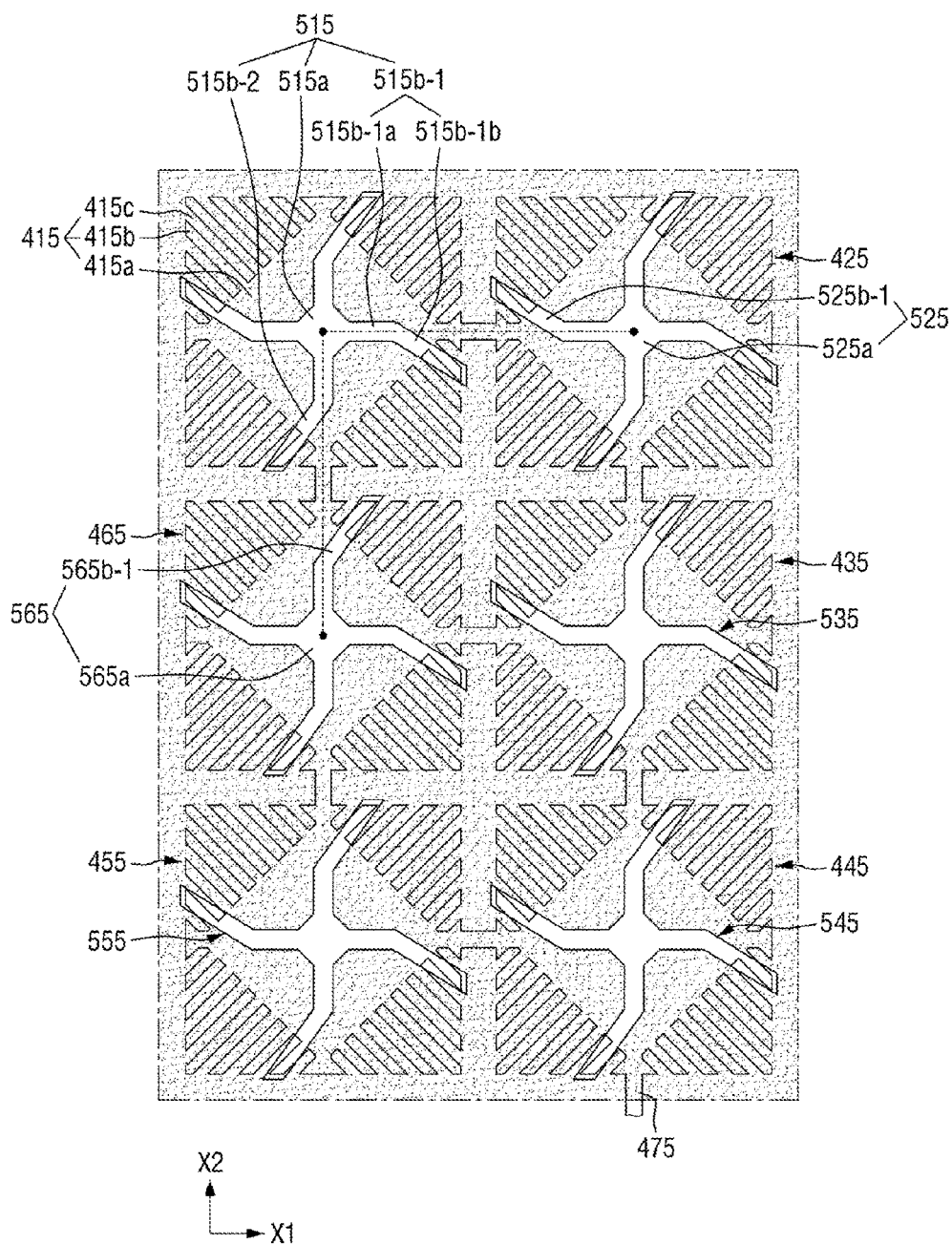

Referring to FIG. 15, a common electrode includes six slits. The first slit 515 that is on the upper left includes a central portion 515a and four extensions that extend from the central portion 515a. More specifically, each of the four extensions includes a first portion that extends from a corresponding extension in a first direction X1 or a second direction X2, and a second portion that extends diagonally from the first portion at an acute angle with respect to the direction in which the first portion extends. For example, the first slit 515 includes a first central portion 515a, a first portion 515b-1a of a first extension 515b-1 that extends from the first central portion 515a toward a second slit 525 that is disposed adjacent to the first slit 515 in the first direction X1, and a second portion 515b-1b of the first extension 515b-1 that extends diagonally from the first portion 515b-1a. The first slit 515 may also include a second extension 515b-2 that extends from the first central portion 515a toward a fourth slit 545 that is disposed adjacent to the first slit 515 in the second direction X2. The second extension portion 515b-2 of the first slit 515 may have substantially the same shape as the first extension portion 515b-1 of the first slit 515.

The second slit 525 includes a second central portion 525a, a first extension portion 525b-1 that extends from the second central portion 525a toward the first slit 515, and the fourth slit 545 includes a fourth central portion 545a and a first extension portion 545b-1 that extends from the fourth central portion 545a toward the first slit 515 that is disposed adjacent to the fourth slit 545 in the second direction X2. The first extension portion 525b-1 of the second slit 525 and the first extension portion 545b-1 of the fourth slit 545 may have substantially the same shape as the first extension portion 515*b*-1 of the first slit 515.

At least first parts (e.g., first portions) of the extensions of a slit may be configured to be aligned with the first direction X1 or the second direction X2, and at least second parts (e.g., second portions) of the extensions of the slit may be configured to be misaligned with the first direction X1 or the second direction X2. Accordingly, a sufficient gap may be secured between slits, and the extension portions of a slit may be configured to have an angle of about 45° with respect to the branch portions of a unit pixel electrode. Therefore, a plurality of domains may be properly formed.

The second, third, fourth, fifth, and sixth unit pixel electrodes 425, 435, 445, 455, and 465 may have the same shape and arrangement as the first unit pixel electrode 415, and the second, third, fourth, fifth, and sixth slits 525, 535, 545, 555, and 565 may have the same shape and arrangement as the first slit 515.

Figure 16:
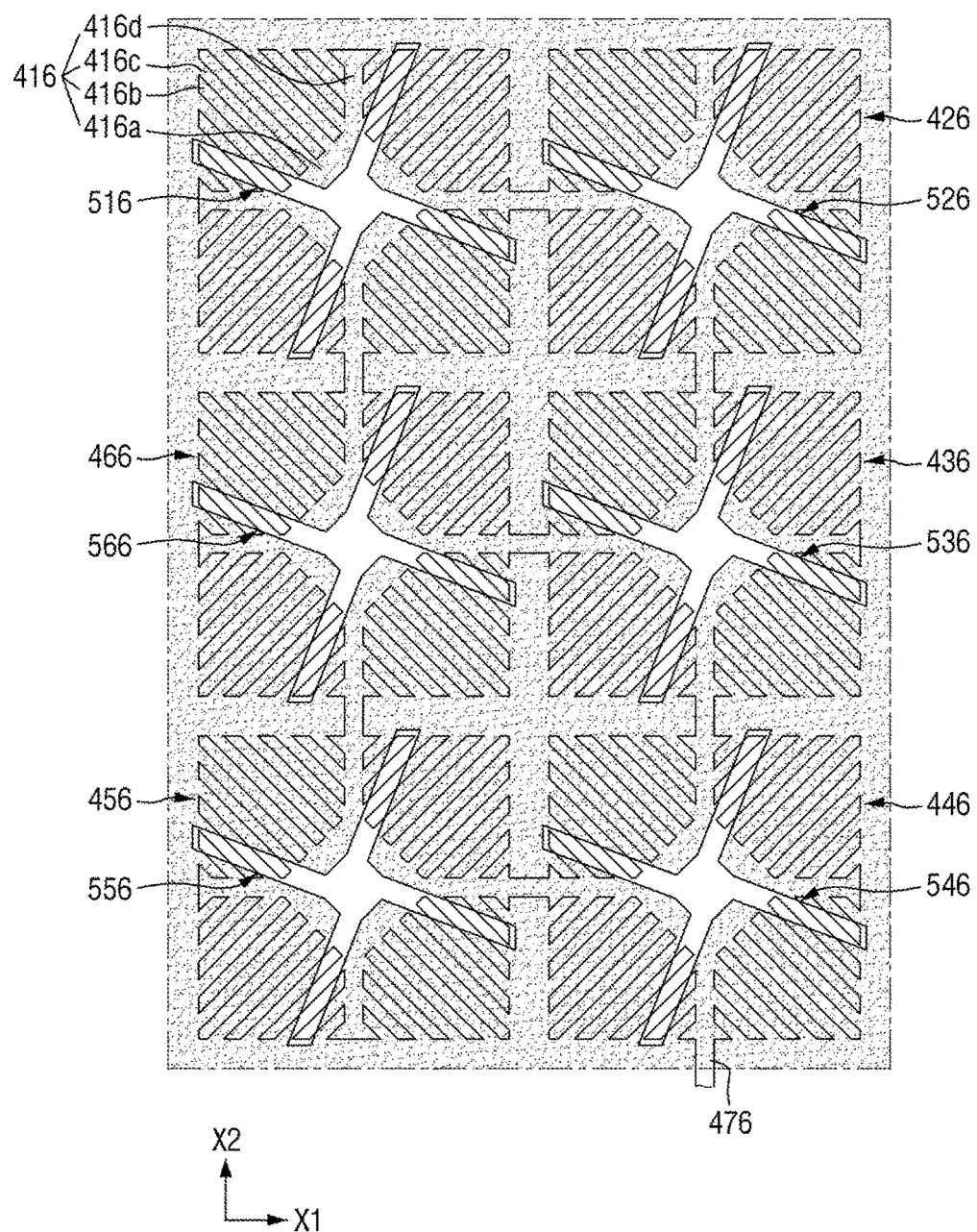

Referring to FIG. 16, a first unit pixel electrode 416 may include a central body portion 416*a*, a plurality of branch portions 416*b* that extend from the central body portion 416*a*, and a plurality of slit portions 416*c* that are formed among the branch portions 416*b*.

The central body portion 416*a* is substantially rhombus-shaped, and the branch portions 416*b* extend from four corners of the central body portion 416*a*. The planar area of the central body portion 416*a* of the first unit pixel electrode 416 is smaller than the planar area of the body portion 410*a* of the pixel electrode 400 shown in FIG. 5. In the present exemplary embodiment, the length by which the branch portions 416*d* extend horizontally or vertically may determine the size of the first unit pixel electrode 416.

The branch portions 416*b* may extend radially from the central body portion 416*a*. The first unit pixel electrode 416 including the branch portions 416*b* and the slit portions 416*c* between the branch portions 416*b* may strengthen a control over liquid crystal molecules with a fringe field, thereby enhancing the response speed of an LCD device and improving afterimages.

The first unit pixel electrode 416 may have four domains that differ from one another in the direction in which the branch portions 416*b* extend. Accordingly, the viewing angle of an LCD device may be widened while reducing texture and improving the transmittance and the response speed of an LCD device.

Figure 17:
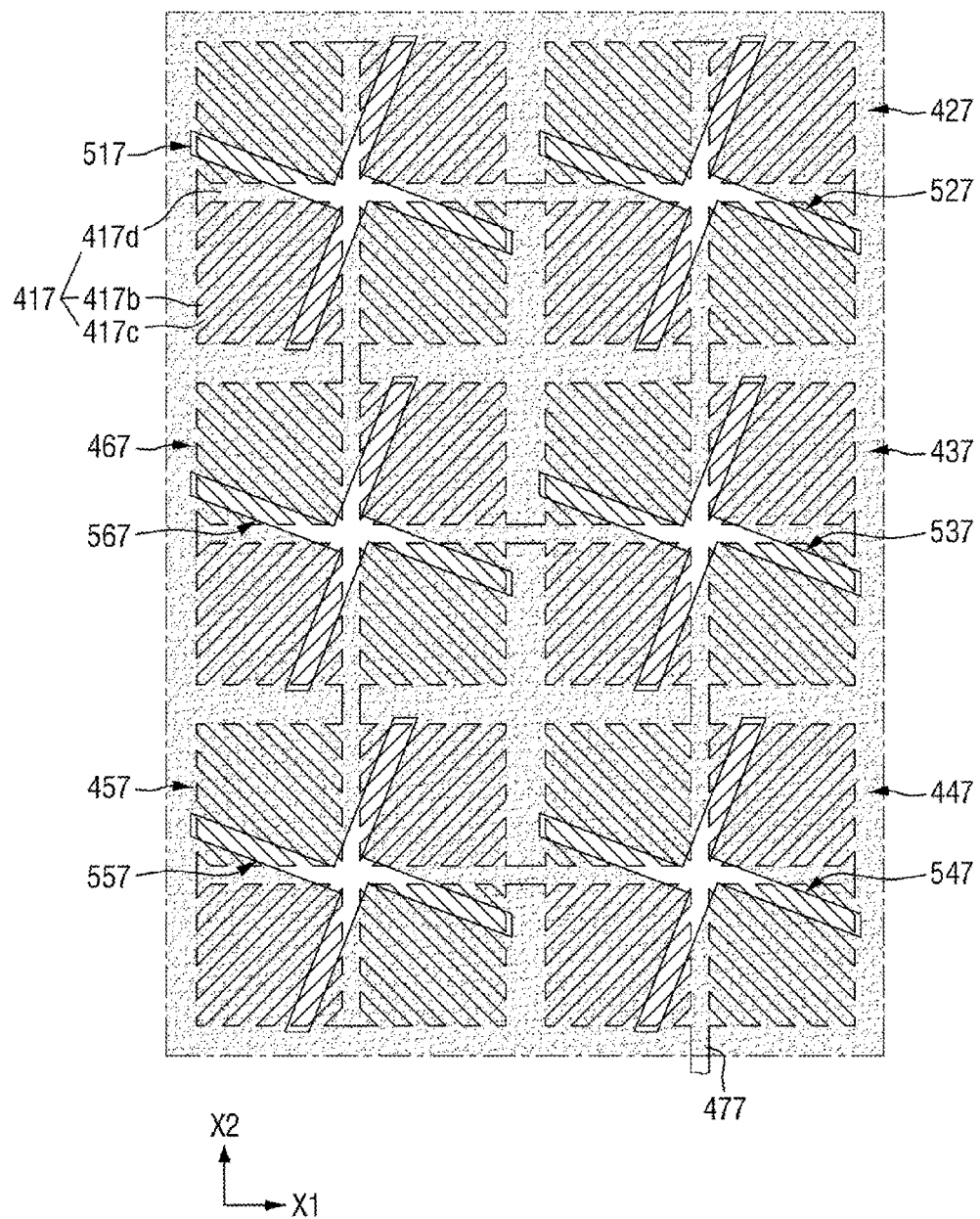

Referring to FIG. 17, a first unit pixel electrode 417 may include a body portion 417*d* that is substantially cross-shaped, and a plurality of branch portions 417*b* that extend from the body portion 417*d*, and a plurality of slit portions 417*c* that are formed among the branch portions 417*b*.

The first unit pixel electrode 417 differs from the first unit pixel electrode 416 of FIG. 16 in that it does not include, in the middle, a central body portion having a predetermined area. A common electrode includes the first, second, third, fourth, fifth, and sixth slits 517, 527, 537, 547, 557, and 567. The first slit 517 differs from its counterpart of FIG. 16 in that it does not include a polygonal central portion. No polygonal central portion may be provided in the first slit 517 to form a fringe field along with the sides of the body portion 417*d* of the first unit pixel electrode 417. The first slit 517 is pivoted relative to the body portion 417*d* of the first unit pixel electrode 417 that is stem-shaped. Accordingly, pattern defects may be prevented, the generation of resistance heat may be reduced, and a slit pattern may be designed according to the specification of an LCD device.

Figure 18:
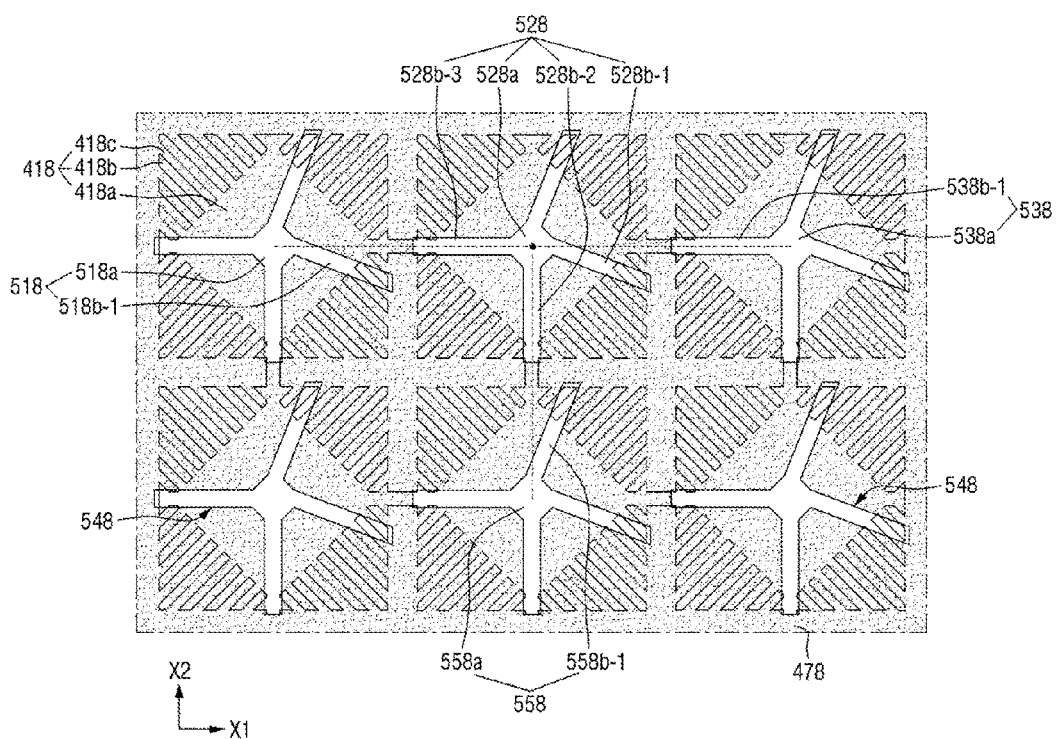

Referring to FIG. 18, among the four extension portions of a second slit 528, the extension portion that extends toward a third slit 538 that is disposed adjacent to the second slit 528 in a first direction X1 is hereinafter referred to as a first extension portion 528*b*-1 of the second slit 528, the extension portion that extends toward a fifth slit 558 that is disposed adjacent to the second slit 528 in a second direction X2 is hereinafter be referred to as a second extension portion 528*b*-2 of the second slit 528, and the extension portion that extends toward a first slit 519 that is disposed adjacent to the second slit 528 in the first direction X1 on the opposite side of the third slit 538 is hereinafter referred to as a third extension portion 528*b*-3 of the second slit 528.

Similarly, among the four extension portions of a third slit 538, the extension portion that extends toward the second slit 528 is hereinafter referred to as a first extension portion 538*b*-1 of the third slit 538, the extension portion of the fifth slit 558 that extends toward the second slit 528 is hereinafter be referred to as a first extension portion 558*b*-1 of the fifth slit 558, and the extension portion of the first slit 518 that extends toward the second slit 528 is hereinafter referred to as a first extension portion 518*b*-1 of the first slit 518.

The end of the first extension portion 528*b*-1 of the second slit 528 may be disposed below an imaginary center line that connects a second central portion 528*a* of the second slit 528 and a third central portion 538*a* of the third slit 538. The end of the first extension portion 538*b*-1 of the third slit 538 may overlap the imaginary center line that connects the second central portion 528*a* and the third central portion 538*a*. The end of the second extension portion 528*b*-2 of the second slit 528 may overlap an imaginary center line that connects the second central portion 528*a* of the second slit 528 and a fifth central portion 558*a* of the fifth slit 558. The end of the first extension portion 558*b*-1 of the fifth slit 558 may be disposed on the right side of the imaginary center line that connects the second central portion 528*a* and the fifth central portion 558*a*. The end of the third extension portion 528*b*-3 of the second slit 528 may overlap an imaginary center line that connects the second central portion 528*a* of the second slit 528 and a first central portion 518*a* of the first slit 518. The end of the first extension portion 518*b*-1 of the first slit 518 may be disposed below the imaginary center line that connects the second central portion 528*a* and the first central portion 518*a*.

Figure 19:
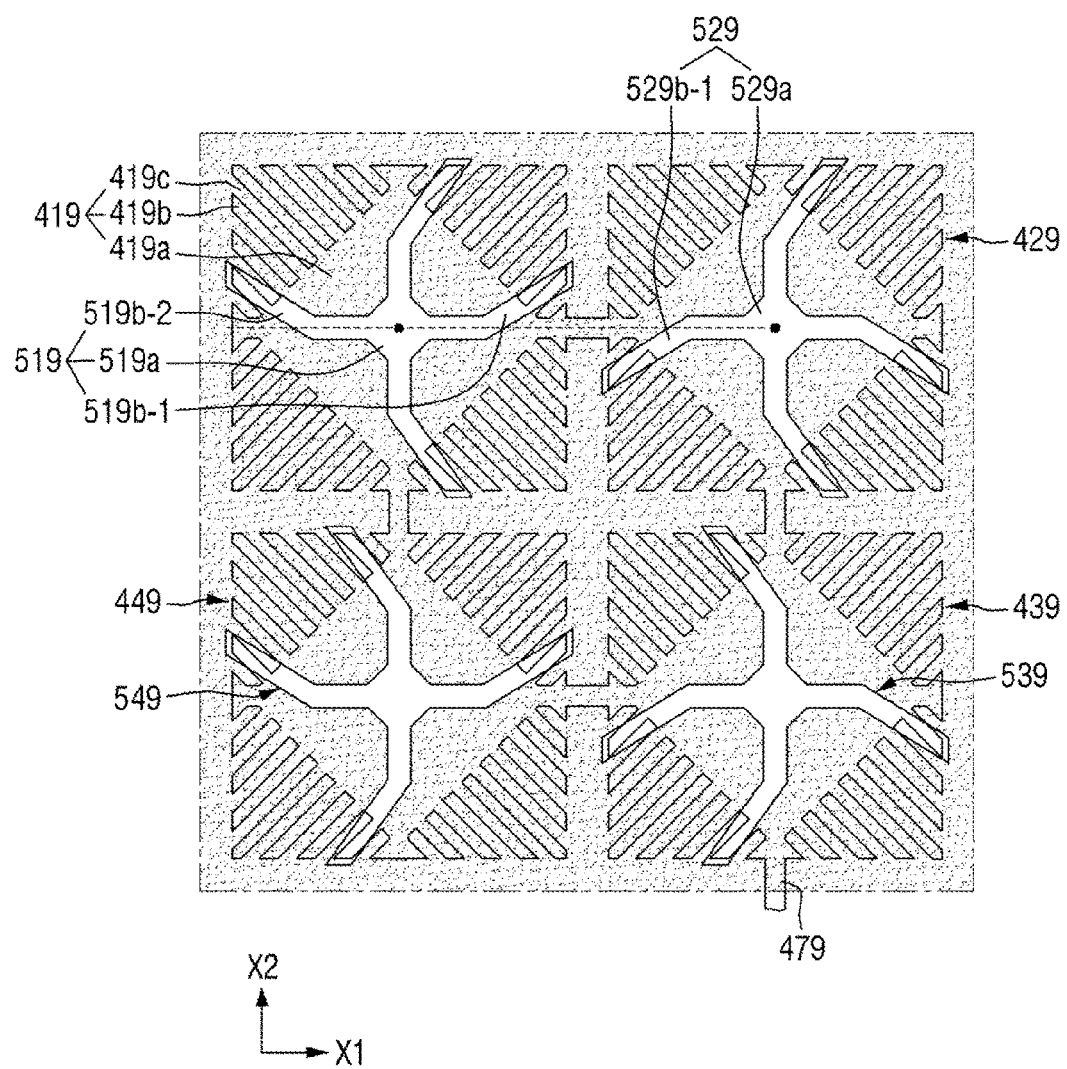

Referring to FIG. 19, among the four extension portions of a first slit 519, the extension portion that extends toward a second slit 529 that is disposed adjacent to the first slit 519 in a first direction X1 is hereinafter referred to as a first extension portion 519*b*-1 of the first slit 519, and the extension portion that extends toward another slit (not illustrated) disposed adjacent to the first slit 519 in the first direction X1 on the opposite side of the second slit 529 is hereinafter referred to as a second extension portion 519*b*-2 of the first slit 519. Among the four extension portions of the second slit 529, the extension portion that extends toward the first slit 519 is hereinafter be referred to as a first extension portion 529*b*-1 of the second slit 529. The end of the first extension portion 519*b*-1 of the first slit 519 and the end of the first extension portion 529*b*-1 of the second slit 529 may be spaced apart from each other.

The end of the first extension portion 519*b*-1 of the first slit 519 may be disposed above an imaginary center line that connects a first central portion 519*a* of the first slit 519 and a second central portion 529*a* of the second slit 529. The end of the first extension portion 529*b*-1 of the second slit 529 may be disposed below the imaginary center line that connects the first central portion 519*a* of the first slit 519 and the second central portion 529*a* of the second slit 529. That is, the end of the first extension portion 519*b*-1 of the first slit 519 and the end of the first extension portion 529*b*-1 of the second slit 529 may be disposed on opposite sides of the imaginary center line in a staggered manner. The end of the first extension portion 519*b*-1 and the end of the second extension portion 519*b*-2 of the first slit 519 may be disposed on the same side of the imaginary center line.

While exemplary embodiments have been shown and described above, it will be apparent to those skilled in the art that modifications and variations could be made without departing from the spirit and scope of the present disclosure. The exemplary embodiments should be considered in a descriptive sense only but not for purposes of limitation.

What is claimed is:

1. A liquid crystal display (LCD) device, comprising:
a plurality of pixel electrodes arranged in a row direction and a column direction;
a common electrode including a plurality of slits that are arranged in the row direction and the column direction; and
a liquid crystal layer interposed between the plurality of pixel electrodes and the common electrode,
wherein:
the plurality of slits include a first slit and a second slit that is disposed adjacent to the first slit in a first direction;
the first slit includes a first central portion and a first extension portion that extends from the first central portion toward the second slit at a first oblique angle to the row direction and the column direction;
the second slit includes a second central portion and a first extension portion that extends from the second central portion toward the first slit at a second oblique angle to the row direction and the column direction;
an end of the first extension portion of the first slit and an end of the first extension portion of the second slit are spaced apart from each other; and
the end of the first extension portion of the first slit and the end of the first extension portion of the second slit are disposed, in a staggered manner, on opposite sides of an imaginary center line that connects the first central portion and the second central portion.

2. The LCD device of claim 1, wherein:
the plurality of slits further include a third slit that is disposed adjacent to the first slit in a second direction;
the first slit further includes a second extension portion that extends from the first central portion toward the third slit at a third oblique angle to the row direction and the column direction;
the third slit includes a third central portion and a first extension portion that extends from the third central portion toward the first slit at a fourth oblique angle to the row direction and the column direction;
an end of the second extension portion of the first slit and an end of the first extension portion of the third slit are spaced apart from each other; and
the end of the second extension portion of the first slit and the end of the first extension portion of the third slit are disposed, in a staggered manner, on opposite sides of an imaginary center line that connects the first central portion and the third central portion.

3. The LCD device of claim 2, wherein:
the plurality of slits further include a fourth slit that is disposed adjacent to the first slit in the second direction;
the first slit further includes a third extension portion that extends from the first central portion toward the fourth slit at a fifth oblique angle to the row direction and the column direction;
the fourth slit includes a fourth central portion and a first extension portion that extends from the fourth central portion toward the first slit at a sixth oblique angle to the row direction and the column direction;
an end of the third extension portion of the first slit and an end of the first extension portion of the fourth slit are spaced apart from each other; and
the end of the third extension portion of the first slit and the end of the first extension portion of the fourth slit are disposed, in a staggered manner, on opposite sides of an imaginary center line that connects the first central portion and the fourth central portion.

4. The LCD device of claim 3, wherein the end of the second extension portion of the first slit and the end of the third extension portion of the first slit are disposed, in a staggered manner, on opposite sides of the imaginary center line that connects the first central portion and the third central portion.

5. The LCD device of claim 3, wherein the end of the second extension portion of the first slit and the end of the third extension portion of the first slit are disposed on the same side of the imaginary center line that connects the first central portion and the third central portion.

6. The LCD device of claim 3, wherein:
the plurality of slits further include a fifth slit that is disposed adjacent to the first slit in the first direction;
the first slit further includes a fourth extension portion that extends from the first central portion toward the fifth slit;
the fifth slit includes a fifth central portion and a first extension portion that extends from the fifth central portion toward the first slit;
an end of the fourth extension portion of the first slit and an end of the first extension portion of the fifth slit are spaced apart from each other; and
the end of the fourth extension portion of the first slit and the end of the first extension portion of the fifth slit are disposed, in a staggered manner, on opposite sides of an imaginary center line that connects the first central portion and the fifth central portion.

7. The LCD device of claim 6, wherein the end of the first extension portion of the first slit and the end of the fourth extension portion of the first slit are disposed, in a staggered manner, on opposite sides of the imaginary center line that connects the first central portion and the second central portion.

8. The LCD device of claim 6, wherein the end of the first extension portion of the first slit and the end of the fourth extension portion of the first slit are disposed on the same side of the imaginary center line that connects the first central portion and the second central portion.

9. A liquid crystal display device comprising:
a plurality of pixel electrodes arranged in a row direction and a column direction;
a common electrode including a plurality of slits that are arranged in the row direction and the column direction; and
a liquid crystal layer interposed between the plurality of pixel electrodes and the common electrode,
wherein:
the plurality of slits include a first slit and a second slit that is disposed adjacent to the first slit in a first direction;
the first slit includes a first central portion and a first extension portion that extends from the first central portion toward the second slit;

the second slit includes a second central portion and a first extension portion that extends from the second central portion toward the first slit;
an end of the first extension portion of the first slit and an end of the first extension portion of the second slit are spaced apart from each other; and
the end of the first extension portion of the first slit and the end of the first extension portion of the second slit are disposed, in a staggered manner, on opposite sides of an imaginary center line that connects the first central portion and the second central portion,
wherein a shortest distance between the end of the first extension portion of the first slit and the end of the first extension portion of the second slit is 5 µm or larger.

10. The LCD device of claim 9, wherein a point at which a line defining the shortest distance and the first extension portion of the first slit meet is defined as a first point, a point at which the line defining the shortest distance and the first extension portion of the second slit meet is defined as a second point, and a distance, in the first direction, between the first point and the second point is shorter than the shortest distance.

11. The LCD device of claim 1, wherein:
each of the plurality of pixel electrodes includes a plurality of unit pixel electrodes;
the plurality of unit pixel electrodes include a first unit pixel electrode that is disposed in an area of overlap with the first slit; and
the first unit pixel electrode includes a first body portion and a first branch portion that extends from the first body portion.

12. The LCD device of claim 11, wherein:
the plurality of unit pixel electrodes further include a second unit pixel electrode that is disposed in an area of overlap with the second slit;
the second unit pixel electrode includes a second body portion and a second branch portion that extends from the second body portion;
the plurality of pixel electrodes further includes a connecting portion that connects the first body portion and the second body portion; and
the connecting portion is disposed in an area of overlap with the imaginary center line that connects the first central portion and the second central portion.

13. The LCD device of claim 11, wherein a planar area of the first body portion of the first unit pixel electrode is larger than a planar area of the first central portion of the first slit.

* * * * *